United States Patent
Yamada

(10) Patent No.: US 10,838,197 B2
(45) Date of Patent: Nov. 17, 2020

(54) OPTICAL SCANNING DEVICE

(71) Applicant: Tsukasa Yamada, Tokyo (JP)

(72) Inventor: Tsukasa Yamada, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 150 days.

(21) Appl. No.: 16/202,698

(22) Filed: Nov. 28, 2018

(65) Prior Publication Data

US 2019/0196176 A1    Jun. 27, 2019

(30) Foreign Application Priority Data

Dec. 21, 2017   (JP) .................................. 2017-244965

(51) Int. Cl.
   *G02B 26/08*   (2006.01)
   *G02B 26/10*   (2006.01)

(52) U.S. Cl.
   CPC ....... *G02B 26/0858* (2013.01); *G02B 26/101* (2013.01)

(58) Field of Classification Search
   None
   See application file for complete search history.

(56) References Cited

U.S. PATENT DOCUMENTS

| 2012/0162739 A1* | 6/2012 | Yamada | G02B 26/101 |
| | | | 359/212.1 |
| 2015/0277108 A1 | 10/2015 | Ogawa et al. | |
| 2020/0049978 A1* | 2/2020 | Ogata | B81B 3/00 |

FOREIGN PATENT DOCUMENTS

| JP | 2015-184592 | 10/2015 |
| JP | 2016-009050 | 1/2016 |
| JP | 2017-116842 | 6/2017 |

* cited by examiner

*Primary Examiner* — Jennifer D. Carruth
(74) *Attorney, Agent, or Firm* — IPUSA, PLLC

(57) ABSTRACT

An optical scanning device includes a mirror including a light reflection surface, a mirror support structure that supports the mirror, a pair of first driving beams connected to the mirror support structure and disposed on the corresponding sides of the mirror support structure, first driving sources disposed on the first driving beams and configured to cause the mirror to rotate around a first axis that passes through the center of the light reflection surface, and a fixed frame that supports the first driving beams. The center of gravity of the mirror and the mirror support structure is located on the first axis.

15 Claims, 14 Drawing Sheets

OPTICAL SCANNING DEVICE

CROSS-REFERENCE TO RELATED APPLICATION

The present application is based upon and claims priority to Japanese Patent Application No. 2017-244965, filed on Dec. 21, 2017, the entire contents of which are incorporated herein by reference.

BACKGROUND OF THE INVENTION

1. Field of the Invention

An aspect of this disclosure relates to an optical scanning device.

2. Description of the Related Art

There is a known optical scanning device that scans light by rotating a mirror around a rotation axis. A sawtooth voltage is used to drive such an optical scanning device, and "ringing" may occur due to resonant oscillation of the mirror when the optical scanning device is driven. The ringing may reduce the quality of images formed by scanning light with the optical scanning device.

Also, it is known that misalignment of the actual rotation axis of a mirror with a symmetry axis set as the rotation axis of the mirror reduces the quality of images formed by scanning light with an optical scanning device. As an example of a technology for preventing misalignment of the actual rotation axis of a mirror with a symmetry axis set as the rotation axis of the mirror, Japanese Laid-Open Patent Publication No. 2015-184592 discloses an optical scanning device where the weight of a half of a mirror with respect to the symmetry axis is greater than the weight of another half of the mirror.

As another example of a technology for preventing misalignment of the actual rotation axis of a mirror with a symmetry axis set as the rotation axis of the mirror, Japanese Laid-Open Patent Publication No. 2016-009050 discloses an optical scanning device that includes multiple piezoelectric cantilevers. The piezoelectric cantilevers include a first piezoelectric cantilever that is disposed adjacent to a mirror and includes a first half and a second half. The first half extends from the symmetry axis to a turnaround part that joins the first piezoelectric cantilever to a second piezoelectric cantilever disposed adjacent to the first piezoelectric cantilever. The second half extends from the symmetry axis toward a side opposite from the turnaround part and is heavier than the first half.

Further, as an example of a technology for preventing unnecessary resonance in a meander structure from adversely affecting normal operations of a mirror, Japanese Laid-Open Patent Publication No. 2017-116842 discloses an optical scanning device where the thickness of a turnaround part of meander beams is different from the thickness of portions of the meander beams other than the turnaround part when piezoelectric components are not formed on the meander beams.

In an actuator that is rotated by a DC driver with a bellows structure, a vertical resonant mode appears as the basic resonant mode. Here, if the weight with respect to the rotation axis is unbalanced, rotational oscillation is added and vertical oscillation is increased. Normally, the vertical drive waveform is a sawtooth waveform with a frequency between about 1 Hz and about 120 Hz. Because the vertical basic resonant mode appears in a frequency range between about 300 Hz and about 1000 Hz, the sawtooth waveform components may include gradient components included in the vertical mode. The gradient components in the vertical mode may cause ringing when the mirror oscillates in a vertical direction and reduce light-scanning quality.

Thus, it is desired to reduce the occurrence of ringing in an optical scanning device.

SUMMARY OF THE INVENTION

In an aspect of this disclosure, there is provided an optical scanning device that includes a mirror including a light reflection surface, a mirror support structure that supports the mirror, a pair of first driving beams connected to the mirror support structure and disposed on the corresponding sides of the mirror support structure, first driving sources disposed on the first driving beams and configured to cause the mirror to rotate around a first axis that passes through the center of the light reflection surface, and a fixed frame that supports the first driving beams. The center of gravity of the mirror and the mirror support structure is located on the first axis.

DESCRIPTION OF THE PREFERRED EMBODIMENTS

Embodiments of the present invention are described below with reference to the accompanying drawings. Throughout the accompanying drawings, the same reference numbers are used for the same components, and repeated descriptions of those components may be omitted.

First Embodiment

Figure 1:
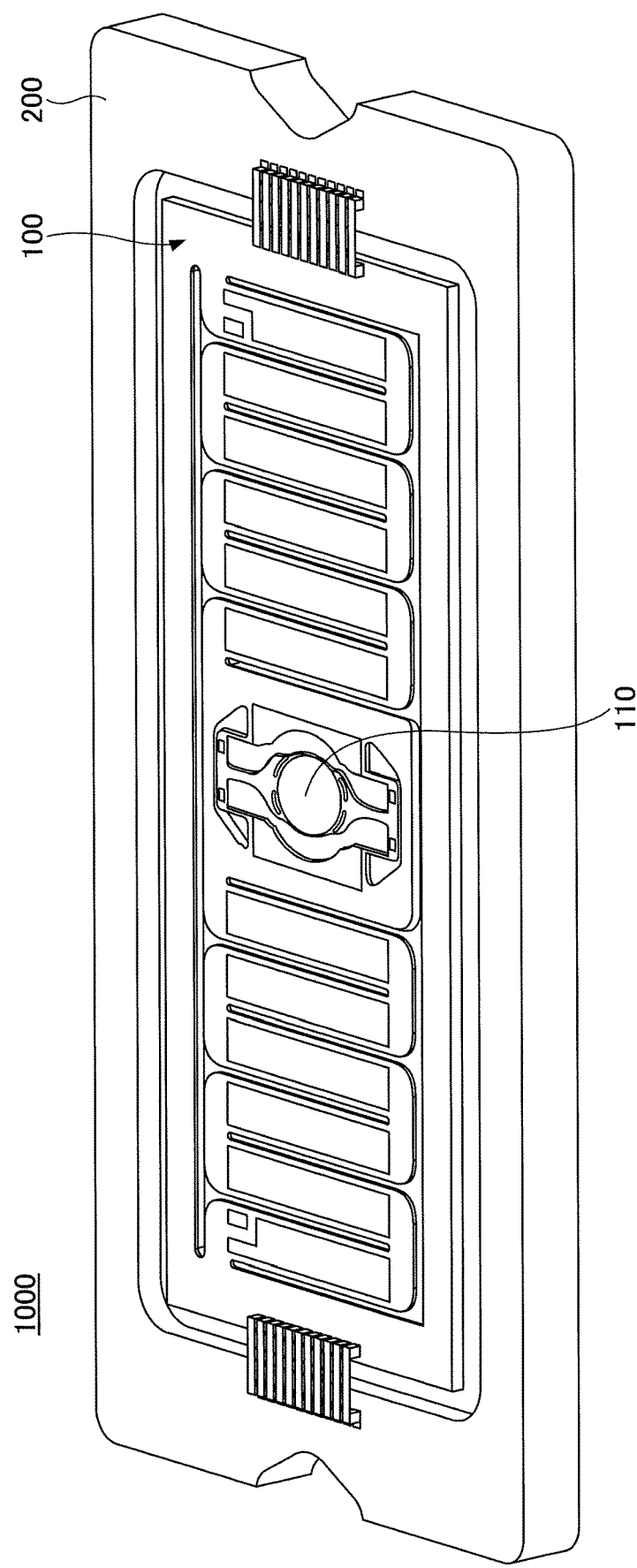
FIG. 1 is a perspective view of an optical scanning device according to a first embodiment.
Figure 2:
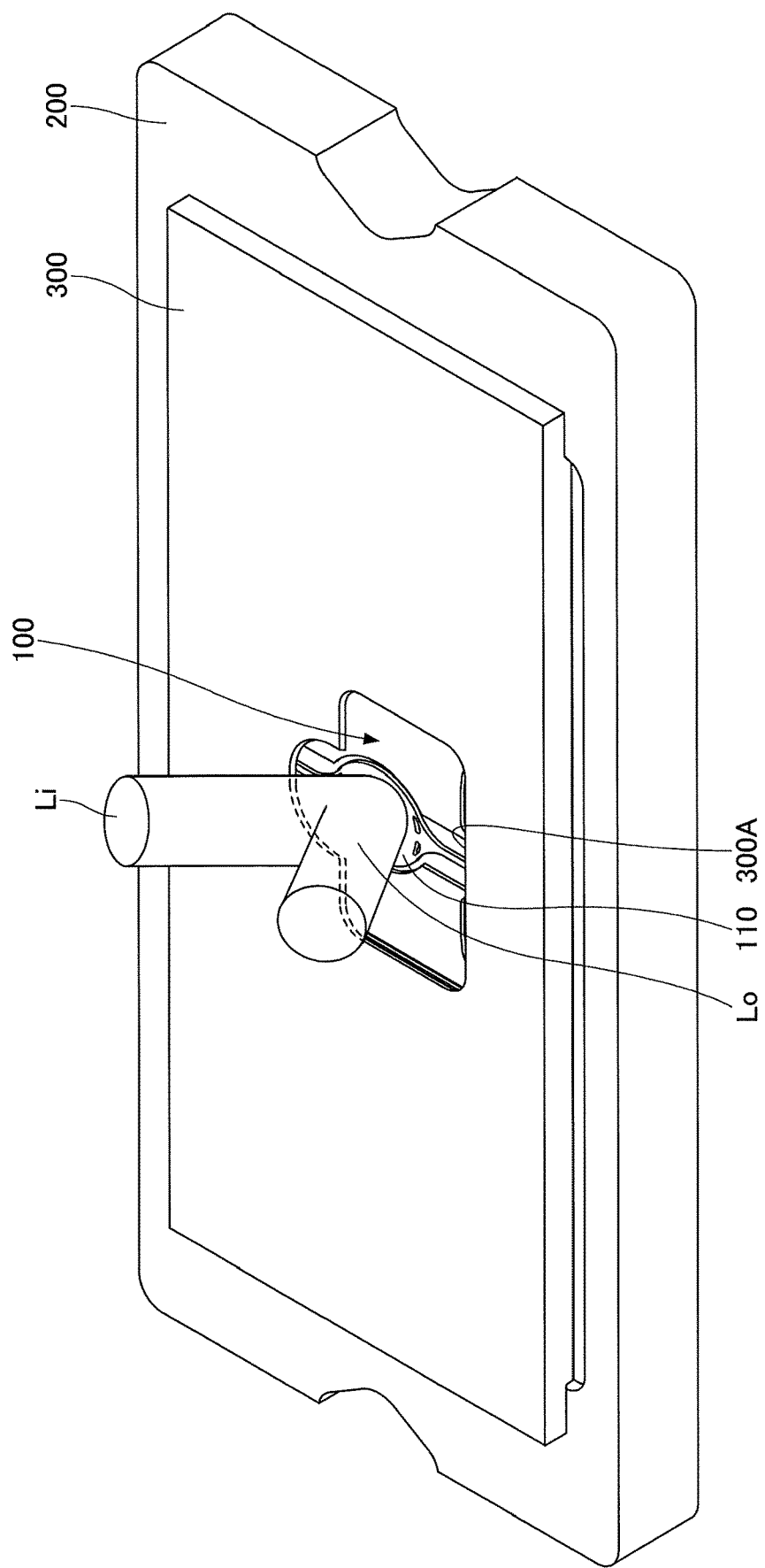
FIG. 2 is another perspective view of the optical scanning device according to the first embodiment.

First, an optical scanning device according to a first embodiment is described. FIGS. 1 and 2 are perspective views of an example of an optical scanning device 1000 according to the first embodiment. FIG. 1 illustrates the optical scanning device 1000 with a package cover detached, and FIG. 2 illustrates the optical scanning device 1000 with a package cover attached.

As illustrated in FIGS. 1 and 2, the optical scanning device 1000 includes an optical scanner 100, a ceramic package 200 on which the optical scanner 100 is mounted, and a package cover 300 that is placed on the ceramic package 200 to cover the optical scanner 100. The optical scanning device 1000 may also include components such as a board and a control circuit disposed below the ceramic package 200.

The optical scanner 100 includes a mirror 110 including a light reflection surface. An opening 300A is formed substantially in the center of the package cover 300 to expose a portion of the optical scanner 100 around the mirror 110. The opening 300A is formed in such a shape that the package cover 300 does not block an incoming laser beam Li entering the mirror 110 and an outgoing laser beam Lo (scanning light) reflected by the mirror 110.

The area of a portion of the opening 300A (laser input opening) through which the incoming laser beam Li passes is less than the area of a portion of the opening 300A (laser output opening) through which the outgoing laser beam Lo passes. More specifically, the laser input opening has a narrow, substantially semicircular shape, and the laser output opening has a wide, substantially rectangular shape. This is because the laser input opening only needs to allow the passage of the incoming laser beam Li that enters from a constant direction, while the laser output opening needs to allow the passage of the outgoing laser beam Lo that is scanned two-dimensionally across a wide range.

Figure 3:
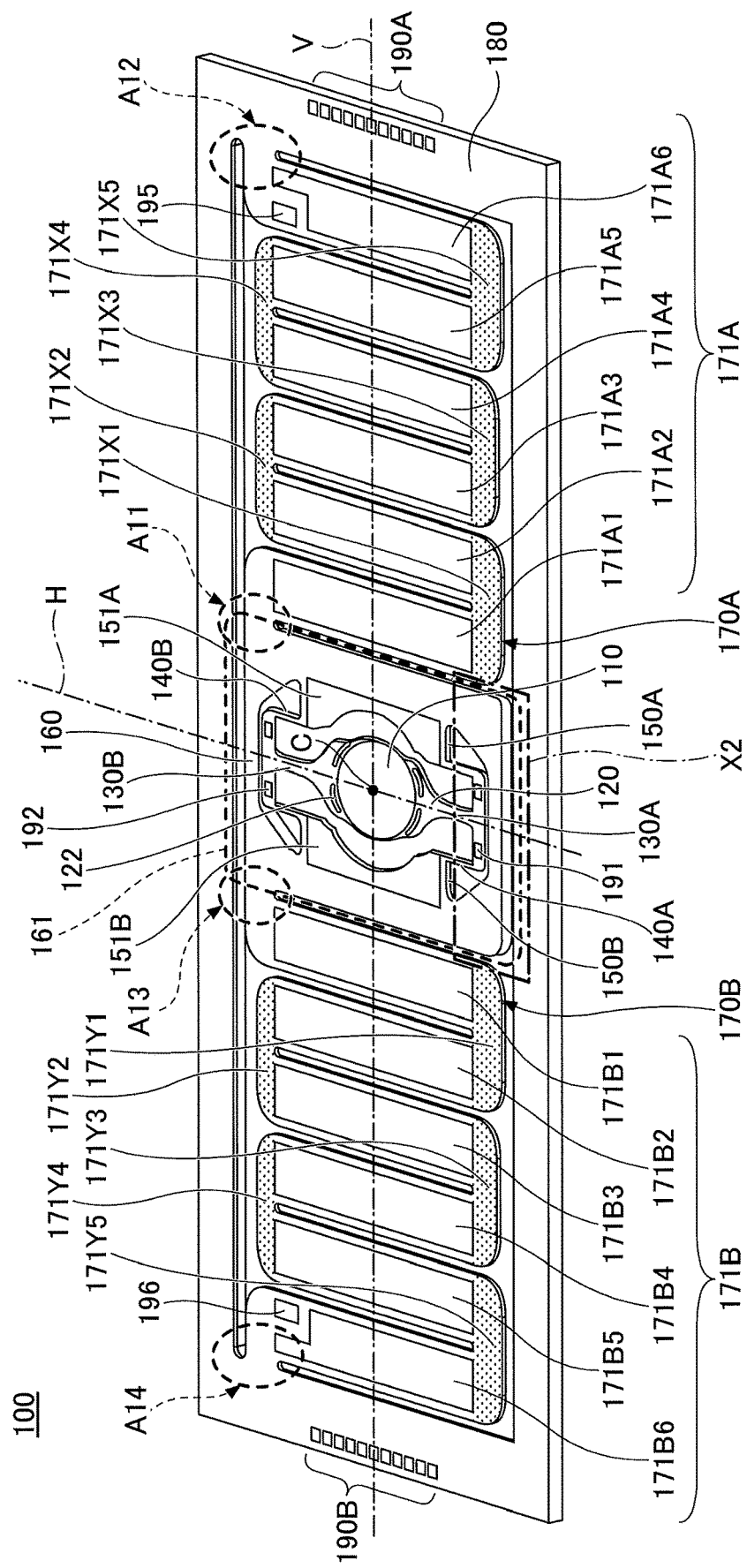
FIG. 3 is a top perspective view of an optical scanner of the optical scanning device according to the first embodiment.

Next, the optical scanner 100 of the optical scanning device 1000 is described. FIG. 3 is a top perspective view of the optical scanner 100 of the optical scanning device 1000 according to the first embodiment.

As illustrated in FIG. 3, the optical scanner 100 includes the mirror 110 that is rotated (or oscillates) to scan an incoming laser beam emitted by a light source. The optical scanner 100 is, for example, a Micro Electro Mechanical Systems (MEMS) mirror where the mirror 110 is driven by piezoelectric elements.

The optical scanner 100 includes the mirror 110, a mirror support 120, torsion beams 130A and 130B, coupling beams 140A and 140B, horizontal driving beams 150A and 150B, a movable frame 160, vertical driving beams 170A and 170B, and a fixed frame 180. The mirror 110 is supported on an upper surface of the mirror support 120. In the first embodiment, the mirror support 120, the torsion beams 130A and 130B, the coupling beams 140A and 140B, the horizontal driving beams 150A and 150B, and the movable frame 160 are collectively referred to as a mirror support structure 161 for supporting the mirror 110.

The vertical driving beams 170A and 170B connected to the mirror support structure 161 are disposed on the corresponding sides of the mirror support structure 161. The vertical driving beam 170A is connected to the mirror support structure 161 via a mirror support structure connector A11. The vertical driving beam 170A is also connected to the fixed frame 180 via a fixed frame connector A12. The vertical driving beam 170B is connected to the mirror support structure 161 via a mirror support structure connector A13. The vertical driving beam 170B is also connected to the fixed frame 180 via a fixed frame connector A14. Details of the vertical driving beams 170A and 170B are described later.

Figure 4A:
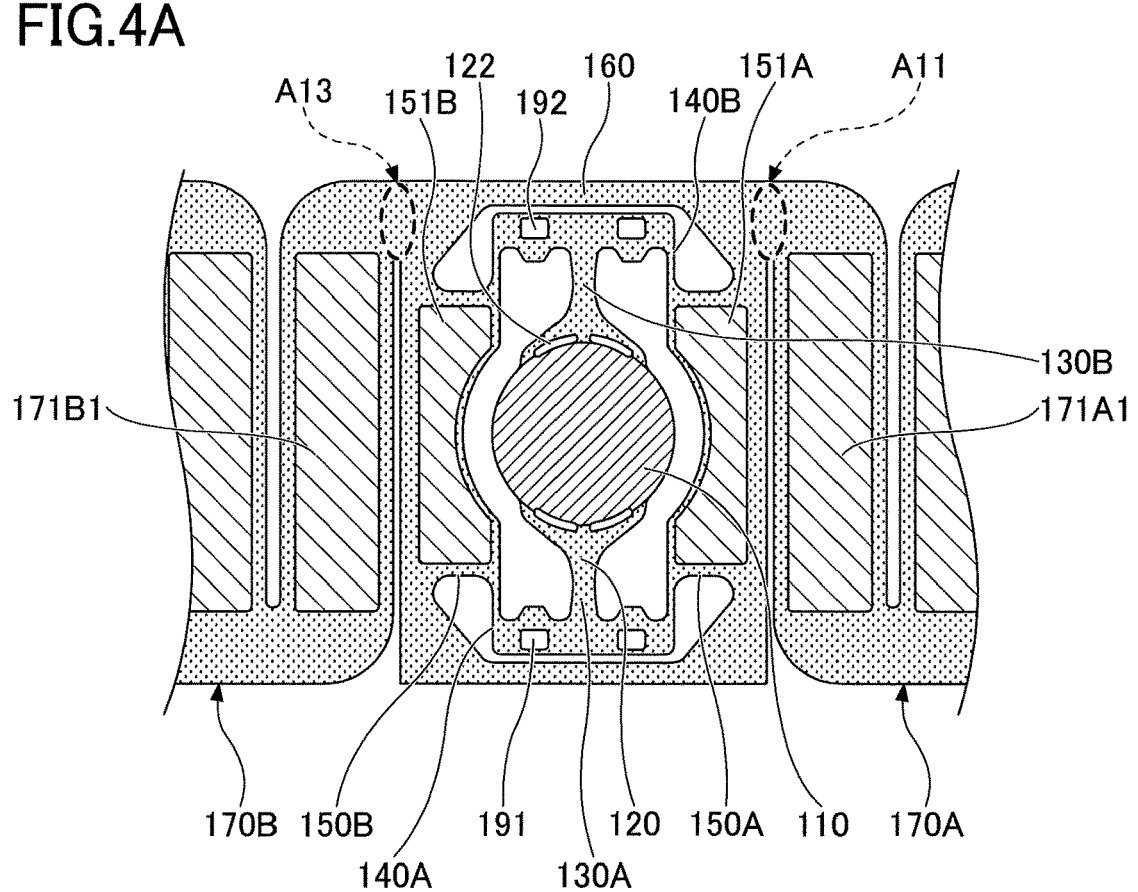
FIGS. 4A and 4B are a top plan view and a bottom plan view of a portion around a mirror of the optical scanner of the optical scanning device according to the first embodiment.
Figure 4B:
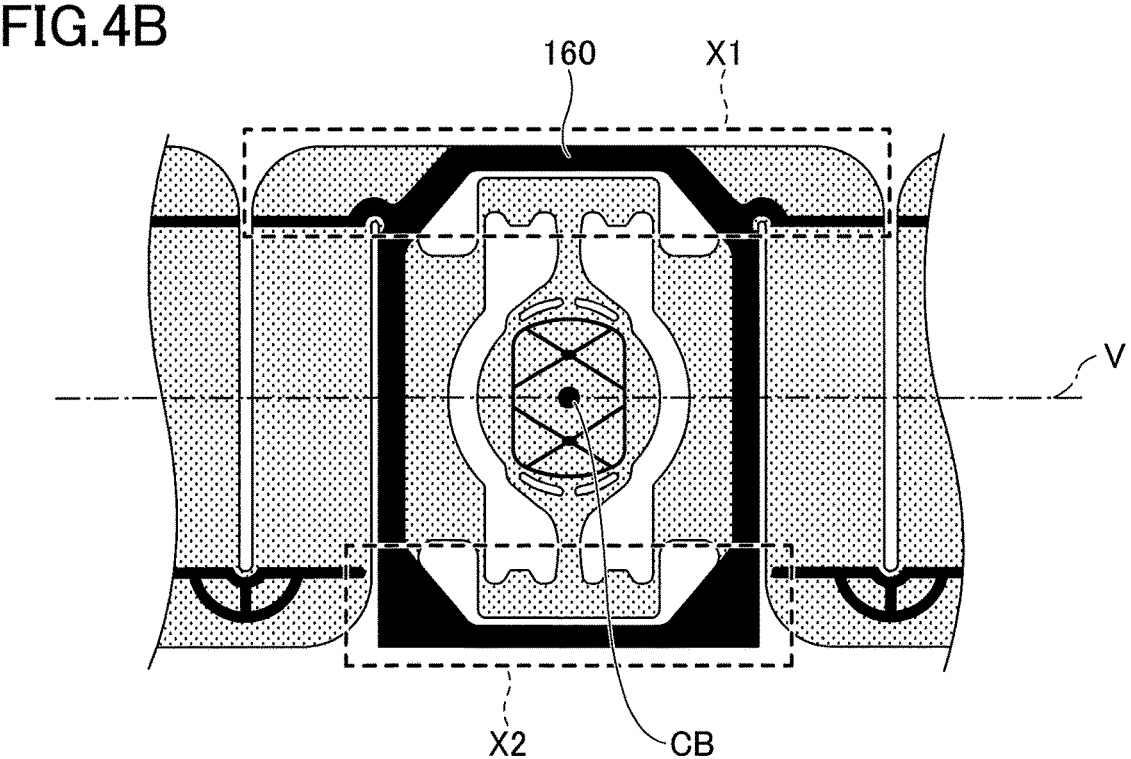

FIG. 4A is a top plan view and FIG. 4B is a bottom plan view of a portion around the mirror 110 of the optical scanner 100 of the optical scanning device 1000 according to the first embodiment. As illustrated in FIGS. 4A and 4B, the horizontal driving beams 150A and 150B connected to the mirror support 120 are disposed on the corresponding sides of the mirror support 120 for supporting the mirror 110. The horizontal driving beams 150A and 150B, the coupling beams 140A and 140B, the torsion beams 130A and 130B, the mirror support 120, and the mirror 110 are supported by the movable frame 160 surrounding these components. One side of each of the horizontal driving beams 150A and 150B is supported by the movable frame 160. Another side of the horizontal driving beam 150A extends inward and is connected to the coupling beams 140A and 140B. Similarly, another side of the horizontal driving beam 150B extends inward and is connected to the coupling beams 140A and 140B. The coupling beams 140A and 140B are connected, respectively, to the torsion beams 130A and 130B that extend along a horizontal-rotation axis H. The torsion beams 130A and 130B support the corresponding sides of the mirror support 120 in the direction of the horizontal-rotation axis H As described above, a pair of the horizontal driving beams 150A and 150B are disposed to sandwich the mirror 110 and the mirror support 120 in a direction that is orthogonal to the horizontal-rotation axis H along which the torsion beams 130A and 130B extend. The horizontal-rotation axis H is described later.

The horizontal driving beams 150A and 150B include horizontal driving sources 151A and 151B, respectively. Also, the vertical driving beams 170A and 170B include vertical driving sources 171A and 171B, respectively. The horizontal driving beams 150A and 150B and the vertical driving beams 170A and 170B function as actuators that cause the mirror 110 to rotate (or oscillate) vertically and horizontally to scan a laser beam.

The horizontal driving sources 151A and 151B are formed, respectively, on the upper surfaces of the horizontal driving beams 150A and 150B. Each of the horizontal driving sources 151A and 151B includes an upper electrode formed on the upper surface of a thin film implementing a piezoelectric element (which is hereafter referred to as a "piezoelectric thin film"), which is on the upper surface of the corresponding one of the horizontal driving beams 150A and 150B, and a lower electrode formed on the lower surface of the piezoelectric thin film. The horizontal driving sources 151A and 151B expand and contract depending on the polarity of a driving voltage applied to the upper electrode and the lower electrode.

Accordingly, when driving voltages with different phases are alternately applied to the horizontal driving beam 150A and the horizontal driving beam 150B, the horizontal driving beam 150A and the horizontal driving beam 150B located on the left and right sides of the mirror 110 alternately oscillate in opposite vertical directions and cause the mirror 110 to rotate (or oscillate) around the horizontal-rotation axis H using the torsion beams 130A and 130B as a rotation shaft or an oscillation shaft. Here, the direction in which the mirror 110 rotates around the torsion beams 130A and 130B is referred to as a horizontal direction, and the axis of this rotation (or oscillation) that passes through a center C of the light reflection surface of the mirror 110 is referred to as the horizontal-rotation axis H. For example, resonant oscillation is used for the horizontal driving by the horizontal driving beams 150A and 150B to cause the mirror 110 to rotate (or oscillate) at high speed.

Slits 122 are formed in the mirror support 120 along the circumference of the mirror 110. The slits 122 reduce the weight of the mirror support 120 and enable the mirror support 120 to transmit torsion of the torsion beams 130A and 130B to the mirror 110.

Also, as illustrated in FIG. 3, the vertical driving beam 170A includes multiple rectangular vertical beams that extend in the direction of the horizontal-rotation axis H. Ends of adjacent vertical beams are connected to each other such that the vertical driving beam 170A forms a zig-zag shape as a whole.

For example, when counted from the side closer to the mirror support structure 161, an end of the first vertical beam and an end of the second vertical beam are joined by a turnaround part 171X1. Another end of the second vertical beam and an end of the third vertical beam are joined by a turnaround part 171X2. Another end of the third vertical beam and an end of the fourth vertical beam are joined by a turnaround part 171X3. Another end of the fourth vertical beam and an end of the fifth vertical beam are joined by a turnaround part 171X4. Another end of the fifth vertical beam and an end of the sixth vertical beam are joined by a turnaround part 171X5. In FIG. 3, the turnaround parts are indicated by shading.

Similarly, the vertical driving beam 170B includes multiple rectangular vertical beams that extend in the direction of the horizontal-rotation axis H, and ends of adjacent vertical beams are connected to each other such that the vertical driving beam 170B forms a zig-zag shape as a whole.

For example, when counted from the side closer to the mirror support structure 161, an end of the first vertical beam and an end of the second vertical beam are joined by a turnaround part 171Y1. Another end of the second vertical beam and an end of the third vertical beam are joined by a turnaround part 171Y2. Another end of the third vertical beam and an end of the fourth vertical beam are joined by a turnaround part 171Y3. Another end of the fourth vertical beam and an end of the fifth vertical beam are joined by a turnaround part 171Y4. Another end of the fifth vertical beam and an end of the sixth vertical beam are joined by a turnaround part 171Y5. In FIG. 3, the turnaround parts are indicated by shading.

On the upper surfaces of the vertical driving beams 170A and 170B, the vertical driving sources 171A and 171B are formed for respective vertical beams that are rectangular units including no curved section. The vertical driving source 171A includes an upper electrode formed on the upper surface of a piezoelectric thin film on the upper surface of the vertical driving beam 170A and a lower electrode formed on the lower surface of the piezoelectric thin film. The vertical driving source 171B includes an upper electrode formed on the upper surface of a piezoelectric thin film on the upper surface of the vertical driving beam 170B and a lower electrode formed on the lower surface of the piezoelectric thin film.

In each of the vertical driving beams 170A and 170B, driving voltages with different polarities are applied to vertical driving sources 171A/171B on adjacent vertical beams to cause the adjacent vertical beams to warp in opposite vertical directions, and the accumulation of the vertical movement of the vertical beams is transmitted to the mirror support structure 161. With the movement of the vertical driving beams 170A and 170B, the mirror 110 and the mirror support structure 161 rotate (or oscillate) around a rotation axis that is orthogonal to the direction of the horizontal-rotation axis H. The direction of this rotation (or oscillation) is referred to as a vertical direction, and this rotation axis that passes through the center C of the light reflection surface of the mirror 110 is referred to as a vertical-rotation axis V. For example, nonresonant oscillation may be used for the vertical driving by the vertical driving beams 170A and 170B.

For example, the vertical driving source 171A includes vertical driving sources 171A1, 171A2, 171A3, 171A4, 171A5, and 171A6 that are formed on the first through sixth vertical beams constituting the vertical driving beam 170A. Similarly, the vertical driving source 171B includes vertical driving sources 171B1, 171B2, 171B3, 171B4, 171B5, and 171B6 that are formed on the first through sixth vertical beams constituting the vertical driving beam 170B. In this case, the mirror 110 and the mirror support structure 161 can be rotated in the vertical direction by driving the vertical driving sources 171A1, 171B1, 171A3, 171B3, 171A5, and 171B5 using the same waveform with a first phase and driving the vertical driving sources 171A2, 171B2, 171A4, 171B4, 171A6, and 171B6 using the same waveform with a second phase that is different from the first phase.

In the optical scanning device 1000 of the first embodiment, the center of gravity of the mirror 110 and the mirror support structure 161 is located on the vertical-rotation axis V. This makes it possible to optimize the weight balance of the mirror 110 and the mirror support structure 161 and to prevent the occurrence of ringing during vertical driving.

Also, in the optical scanning device 1000 of the first embodiment where the mirror 110 can be rotated around the vertical-rotation axis V and the horizontal-rotation axis H, the center of gravity of the mirror 110 and the mirror support 120 is preferably located at the intersection between the vertical-rotation axis V and the horizontal-rotation axis H, i.e., at the center C of the mirror 110. This makes it possible to optimize the weight balance of the mirror 110 and the mirror support structure 161 and prevent the occurrence of ringing during vertical driving, and also makes it possible to optimize the weight balance of the mirror 110 and the mirror support 120 and prevent the occurrence of ringing during horizontal driving. Thus, the configuration of the first embodiment makes it possible to prevent the occurrence of ringing during vertical driving and horizontal driving.

In the optical scanning device 1000 of the first embodiment, one side (first side) of the mirror 110 and the mirror support structure 161 is preferably heavier than the other side (second side) of the mirror 110 and the mirror support structure 161 with respect to the vertical-rotation axis V. This makes it possible to optimize the weight balance of the mirror 110 and the mirror support structure 161 and makes it easier to set the center of gravity of the mirror 110 and the mirror support structure 161 on the vertical-rotation axis V. For example, the first side of the mirror 110 and the mirror support structure 161 can be made heavier than the second side of the mirror 110 and the mirror support structure 161 with respect to the vertical-rotation axis V by making the first side of the movable frame 160 heavier than the second side of the movable frame 160 with respect to the vertical-rotation axis V. To achieve this configuration, for example, the width of the movable frame 160 on the first side may be made greater than the width of the movable frame 160 on the second side with respect to the vertical-rotation axis V.

In the example of FIG. 4B, a portion of the movable frame 160 in an area X2 includes right-angled corners and is wider than a portion of the movable frame 160 in an area X1. More specifically, the portion of the movable frame 160 in the area X2 includes a part(s) whose inner surface is inclined and angled with respect to the vertical-rotation axis V and the horizontal-rotation axis H and a part whose inner surface is in parallel with the vertical-rotation axis V. The part whose inner surface is inclined and angled with respect to the vertical-rotation axis V and the horizontal-rotation axis H includes a right-angled corner and becomes wider as the distance from the vertical-rotation axis V increases. Also, the part whose inner surface is in parallel with the vertical-rotation axis V may be wider than a parallel part in the area X1. Further, in the area X1, omissible ribs are removed to reduce the weight. Thus, the first side of the mirror 110 and the mirror support structure 161 is made heavier than the second side of the mirror 110 and the mirror support structure 161 with respect to the vertical-rotation axis V.

Figure 5A:
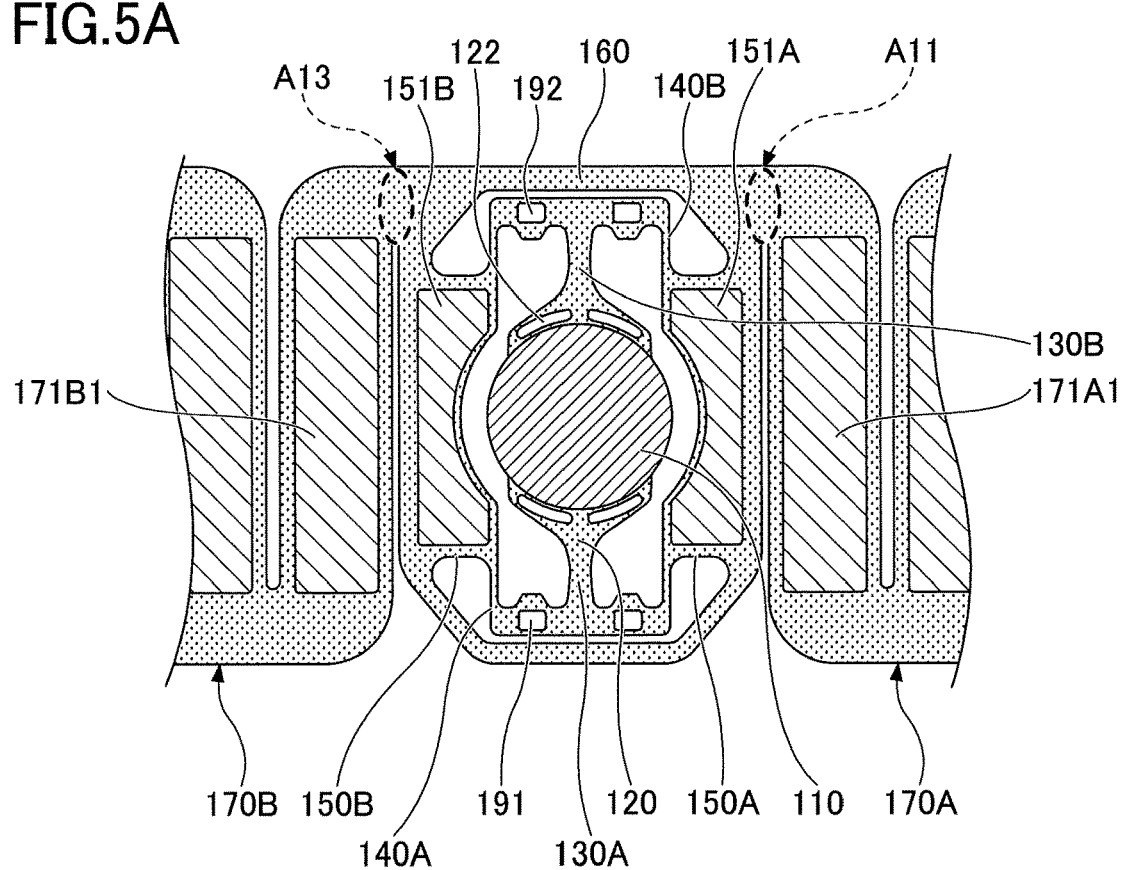
FIGS. 5A and 5B are a top plan view and a bottom plan view of a portion around a mirror of an optical scanner of an optical scanning device according to a first comparative example.
Figure 5B:
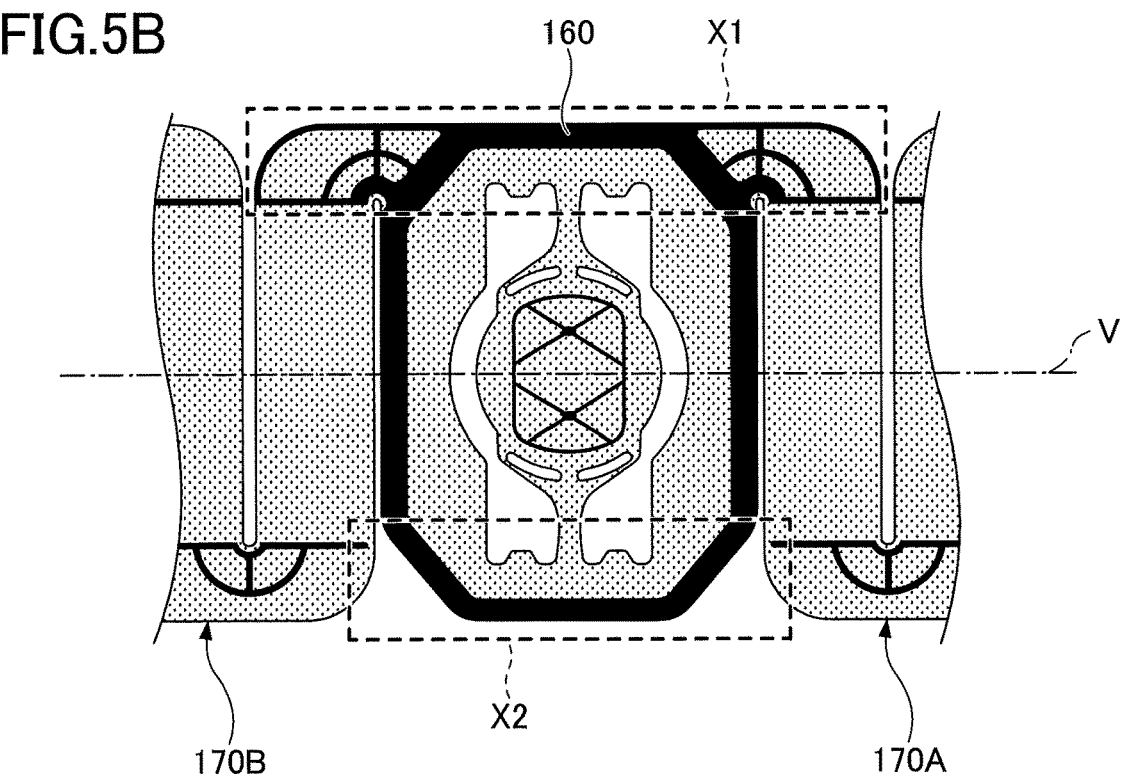

FIGS. 5A and 5B are a top plan view and a bottom plan view of a portion around a mirror of an optical scanner of an optical scanning device according to a first comparative example. In the optical scanning device of FIGS. 5A and 5B, the width of a portion of the movable frame 160 in an area X2 is substantially the same as the width of a portion of the movable frame 160 in an area X1. That is, the width of the movable frame 160 is substantially constant throughout its perimeter. Also, in the area X1, ribs are formed on the back side of portions connecting the movable frame 160 to the vertical driving beams 170A and 170B. Thus, the optical scanning device of the comparative example is different from the optical scanning device 1000 of the first embodiment in the above-described points. In the optical scanning device illustrated by FIGS. 5A and 5B, the weight of one side of the mirror 110 and the mirror support structure 161 is substantially the same as the weight of the other side of the mirror 110 and the mirror support structure 161 with respect to the vertical-rotation axis V. For this reason, the center of gravity of the mirror 110 and the mirror support structure 161 is misaligned with the vertical-rotation axis V and is shifted from the vertical-rotation axis V toward the mirror support structure connectors A11 and A13. On the other hand, the optical scanning device 1000 of the first embodiment is configured such that the center of gravity of the mirror 110 and the mirror support structure 161 is located on the vertical-rotation axis V.

In the optical scanning device 1000 of the first embodiment, as illustrated in FIG. 3, the mirror support structure connector A11 may be located on the same side on which the fixed frame connector A12 is located with respect to the vertical-rotation axis V. Also, the mirror support structure connector A13 may be located on the same side on which the fixed frame connector A14 is located with respect to the vertical-rotation axis V. In the optical scanning device 1000 of the first embodiment, the mirror support structure connectors A11 and A13 are disposed on one side (second side) of the optical scanner 100 with respect to the vertical-rotation axis V, and the first side (the side of the area X2) of the mirror support structure 161 is made heavier than the second side of the mirror support structure 161 with respect to the vertical-rotation axis V. That is, the first side (the side of the area X2) of the movable frame 160 is made heavier than the second side of the movable frame 160 with respect to the vertical-rotation axis V. Also, the fixed frame connectors A12 and A14 are located on the second side of the optical scanner 100 with respect to the vertical-rotation axis V.

As another example, the mirror support structure connector A11 may be located on a side that is opposite the side on which the fixed frame connector A12 is located with respect to the vertical-rotation axis V. Also, the mirror support structure connector A13 may be located on a side that is opposite the side on which the fixed frame connector A14 is located with respect to the vertical-rotation axis V. The mirror support structure connectors A11 and A13 may be located on a side that is opposite the side on which the fixed frame connectors A12 and A14 are located with respect to the vertical-rotation axis V such that end portions of the mirror support structure connectors A11 and A13 overlap the vertical-rotation axis V.

Also, the vertical driving beam 170A and the vertical driving beam 170B may be arranged axisymmetrically about the horizontal-rotation axis H. This configuration makes it possible to optimize the weight balance of the mirror 110 and the mirror support 120 and makes it easier to set the center of gravity of the mirror 110 and the mirror support 120 on the horizontal-rotation axis H.

Drive wires for applying driving voltages to the upper electrode and the lower electrode of the horizontal driving source 151A are connected to predetermined terminals in a terminal group 190A provided on the fixed frame 180. Drive wires for applying driving voltages to the upper electrode and the lower electrode of the horizontal driving source 151B are connected to predetermined terminals in a terminal group 190B provided on the fixed frame 180. Drive wires for applying driving voltages to the upper electrode and the lower electrode of the vertical driving source 171A are connected to predetermined terminals in the terminal group 190A provided on the fixed frame 180. Drive wires for applying driving voltages to the upper electrode and the lower electrode of the vertical driving source 171B are connected to predetermined terminals in the terminal group 190B provided on the fixed frame 180.

The optical scanner 100 also includes piezoelectric sensors 191 and 192 used as horizontal tilt angle sensors that detect a tilt in the horizontal direction (horizontal tilt angle) of the mirror 110 while the mirror 110 is being rotated in the horizontal direction by applying driving voltages to the horizontal driving sources 151A and 151B. The piezoelectric sensor 191 is provided on the coupling beam 140A, and the piezoelectric sensor 192 is provided on the coupling beam 140B.

The optical scanner 100 also includes piezoelectric sensors 195 and 196 used as vertical tilt angle sensors that detect a tilt in the vertical direction (vertical tilt angle) of the mirror 110 while the mirror 110 is being rotated in the vertical direction by applying driving voltages to the vertical driving sources 171A and 171B. The piezoelectric sensor 195 is provided on one of the vertical beams constituting the vertical driving beam 170A, and the piezoelectric sensor 196 is provided on one of the vertical beams constituting the vertical driving beam 170B.

The piezoelectric sensor 191 outputs a current value that varies depending on the horizontal tile angle of the mirror 110 and corresponds to the displacement of the coupling beam 140A caused by the torsion of the torsion beam 130A.

The piezoelectric sensor 192 outputs a current value that varies depending on the horizontal tile angle of the mirror 110 and corresponds to the displacement of the coupling beam 140B caused by the torsion of the torsion beam 130B. The piezoelectric sensor 195 outputs a current value that varies depending on the vertical tilt angle of the mirror 110 and corresponds to the displacement of the vertical beam of the vertical driving beam 170A on which the piezoelectric sensor 195 is provided. The piezoelectric sensor 196 outputs a current value that varies depending on the vertical tilt angle of the mirror 110 and corresponds to the displacement of the vertical beam of the vertical driving beam 170B on which the piezoelectric sensor 196 is provided.

In the first embodiment, the horizontal tilt angle of the mirror 110 is detected based on outputs from the piezoelectric sensors 191 and 192, and the vertical tilt angle of the mirror 110 is detected based on outputs from the piezoelectric sensors 195 and 196. A tilt detector for detecting tilt angles of the mirror 110 based on current values output from the piezoelectric sensors 191, 192, 195, and 196 may be provided outside of the optical scanner 100. Also, a drive controller for controlling driving voltages to be applied to the horizontal driving sources 151A and 151B and the vertical driving sources 171A and 171B based on detection results of the tilt detector may be provided outside of the optical scanner 100.

Each of the piezoelectric sensors 191, 192, 195, and 196 includes an upper electrode formed on the upper surface of a piezoelectric thin film and a lower electrode formed on the lower surface of the piezoelectric thin film. In the first embodiment, each of the piezoelectric sensors 191, 192, 195, and 196 outputs a current value of sensor wires connected to the upper electrode and the lower electrode.

The sensor wires extending from the upper electrode and the lower electrode of the piezoelectric sensor 191 are connected to predetermined terminals in the terminal group 190B provided on the fixed frame 180. The sensor wires extending from the upper electrode and the lower electrode of the piezoelectric sensor 195 are connected to predetermined terminals in the terminal group 190A provided on the fixed frame 180. The sensor wires extending from the upper electrode and the lower electrode of the piezoelectric sensor 192 are connected to predetermined terminals in the terminal group 190B provided on the fixed frame 180. The sensor wires extending from the upper electrode and the lower electrode of the piezoelectric sensor 196 are connected to predetermined terminals in the terminal group 190B provided on the fixed frame 180.

The optical scanner 100 may be formed using a silicon-on-insulator (SOI) substrate including, for example, a support layer, a buried oxide (BOX) layer, and an active layer. For example, ribs on the back surfaces of the movable frame 160 and the horizontal driving beams 150A and 150B and ribs on the back surfaces of the vertical driving beams 170A and 170B may be formed by patterning the support layer. Also, the horizontal driving beams 150A and 150B and the vertical driving beams 170A and 170B may be formed by patterning the active layer or the active layer and the BOX layer.

Figure 6:
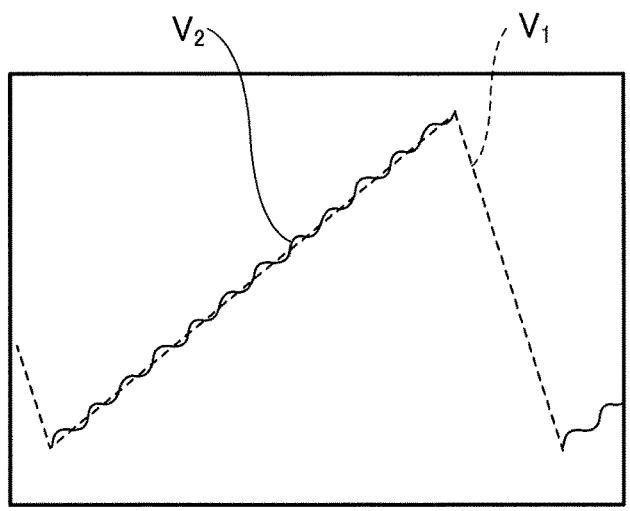
FIG. 6 is a graph illustrating a relationship between a waveform of a voltage applied to driving sources and an operation waveform of a mirror.
Figure 7:
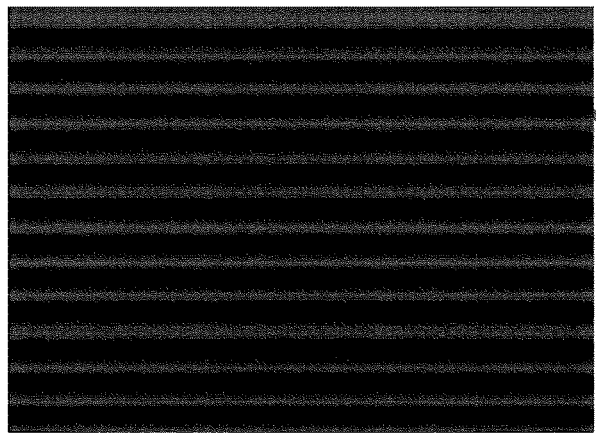
FIG. 7 is a drawing illustrating an image displayed by using an optical scanning device.

Next, operations of the optical scanning device 1000 are described. FIG. 6 is a graph illustrating a relationship between a waveform of a voltage applied to the vertical driving sources 171A and 171B and an operation waveform of the mirror 110. In FIG. 6, a dotted line indicates a driving voltage waveform $V_1$ and a solid line indicates a mirror operation waveform $V_2$. FIG. 7 is a drawing illustrating an image displayed by using the optical scanning device 1000.

As illustrated in FIG. 6, a voltage with a sawtooth waveform is applied to the vertical driving sources 171A and 171B. Compared with a case where a voltage with a sinusoidal waveform is applied, applying a voltage with a sawtooth waveform makes it possible to lengthen a period where the light scanning speed of the mirror 110 becomes constant.

When a voltage with the driving voltage waveform $V_1$ having a sawtooth shape as illustrated in FIG. 6 is applied to the vertical driving sources 171A and 171B to drive the mirror 110, the mirror operation waveform $V_2$ of the mirror 110 oscillates, i.e., ringing occurs. When ringing occurs while displaying an image using the optical scanning device 1000, horizontal stripes appear as illustrated in FIG. 7.

The ringing may be prevented by removing a frequency component corresponding to the eigenfrequency that causes ringing or a harmonic component of the eigenfrequency using a filter such as a notch filter.

However, if there are multiple eigenmodes to be removed, it is necessary to perform wideband filtering using multiple filters to remove frequency components corresponding to the eigenfrequencies or harmonic components of the eigenfrequencies. If wideband filtering is performed, the driving voltage waveform $V_1$ having a sawtooth shape (dotted line) becomes blunt and its linearity is reduced as indicated by a mirror operation waveform $V_3$ (solid line) in FIG. 8.

Figure 8:
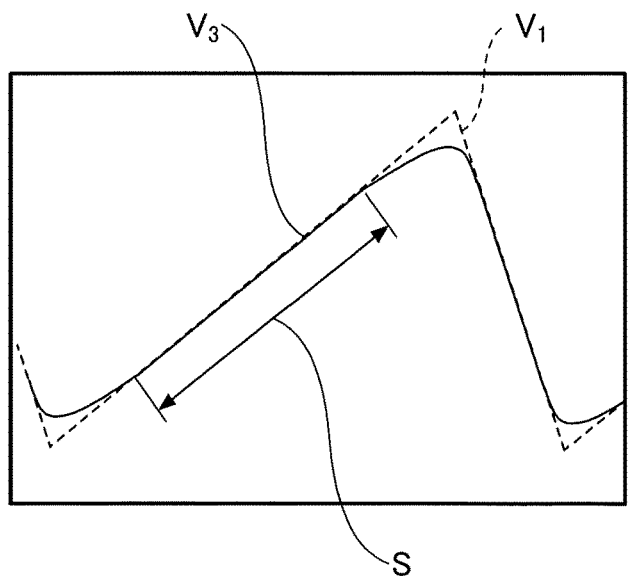
FIG. 8 is a drawing illustrating a blunt mirror operation waveform.

As a result, a linear section S in FIG. 8 corresponding to a vertical drawing section (a section where the scanning speed of the optical scanning device is constant) becomes short and the section usable for displaying an image decreases. Accordingly, to prevent ringing while securing a section usable for displaying an image, reducing the number of eigenmodes to be removed is more effective than performing wideband filtering.

Figure 9A:
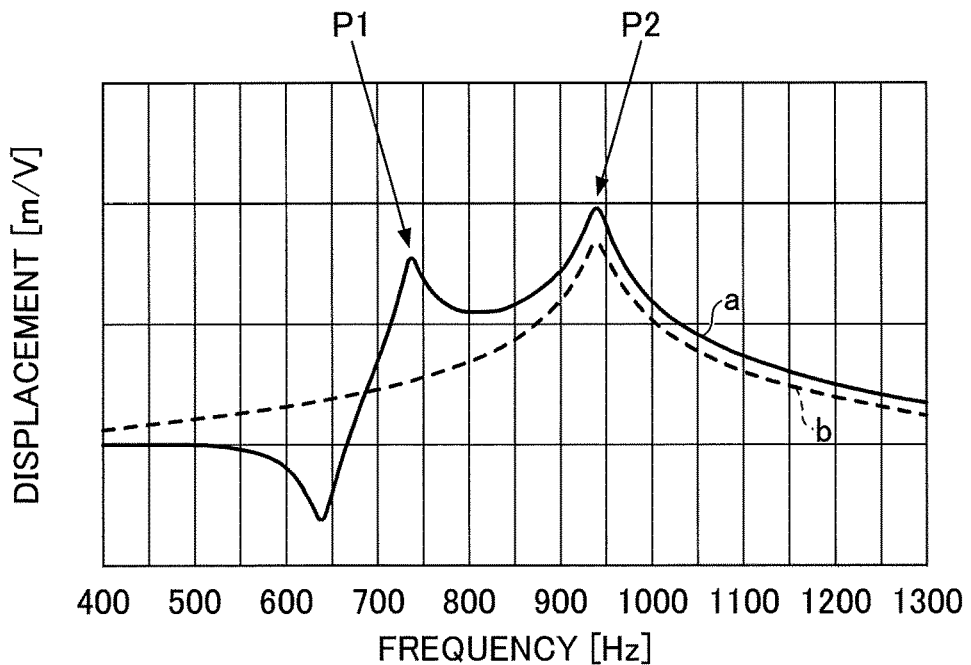
FIGS. 9A and 9B are graphs illustrating frequency characteristics of optical scanning devices.
Figure 9B:
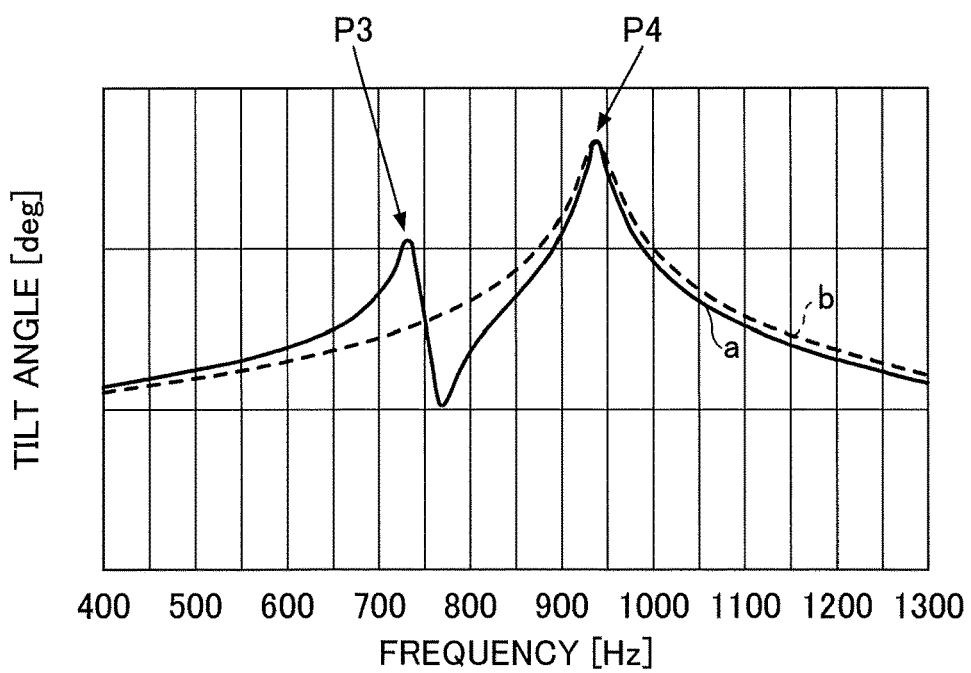

FIGS. 9A and 9B are graphs illustrating frequency characteristics of optical scanning devices. In FIGS. 9A and 9B, a solid line "a" indicates the frequency characteristic of the optical scanning device of the first comparative example, and a dotted line "b" indicates the frequency characteristic of the optical scanning device 1000 of the first embodiment. In FIG. 9A, the horizontal axis indicates a frequency (Hz) of the driving voltage waveform $V_1$, and the vertical axis indicates a vertical displacement (m/V) of the mirror 110. In FIG. 9B, the horizontal axis indicates a frequency (Hz) of the driving voltage waveform $V_1$, and the vertical axis indicates a vertical tilt angle (deg) of the mirror 110. As illustrated in FIGS. 5A and 5B, the optical scanning device of the first comparative example is different from the optical scanning device 1000 in that the width of the movable frame is substantially the same throughout its perimeter and the center of gravity of the mirror 110 and the mirror support structure 161 is misaligned with the vertical-rotation axis V. Other configurations of the optical scanning device of the first comparative example are substantially the same as those of the optical scanning device 1000.

As indicated by displacement-frequency characteristics in FIG. 9A, with the optical scanning device of the first comparative example, an eigenmode appears at a frequency f0 near 700 Hz indicated by P1, and an eigenmode appears at a frequency f1 near 900 Hz indicated by P2. Also, as indicated by tilt-angle-frequency characteristics in FIG. 9B, with the optical scanning device of the first comparative example, an eigenmode appears at the frequency f0 near 700 Hz indicated by P3, and an eigenmode appears at the frequency f1 near 900 Hz indicated by P4. Thus, with the optical scanning device of the first comparative example, an upper limit+tilt mode appears at the frequency f0 near 700 Hz, and a tilt mode appears at the frequency f1 near 900 Hz.

On the other hand, as indicated by displacement-frequency characteristics in FIG. 9A, with the optical scanning device 1000 of the first embodiment, no eigenmode appears at the frequency f0 near 700 Hz indicated by P1, and an eigenmode appears at the frequency f1 near 900 Hz indicated by P2. As indicated by tilt-angle-frequency characteristics in FIG. 9B, with the optical scanning device 1000 of the first embodiment, no eigenmode appears at the frequency f0 near 700 Hz indicated by P3, and an eigenmode appears at the frequency f1 near 900 Hz indicated by P4. Thus, with the optical scanning device 1000 of the first embodiment, substantially no upper limit+tilt mode appears at the frequency f0 near 700 Hz, and a tilt mode appears only at the frequency f1 near 900 Hz.

Figure 10A:
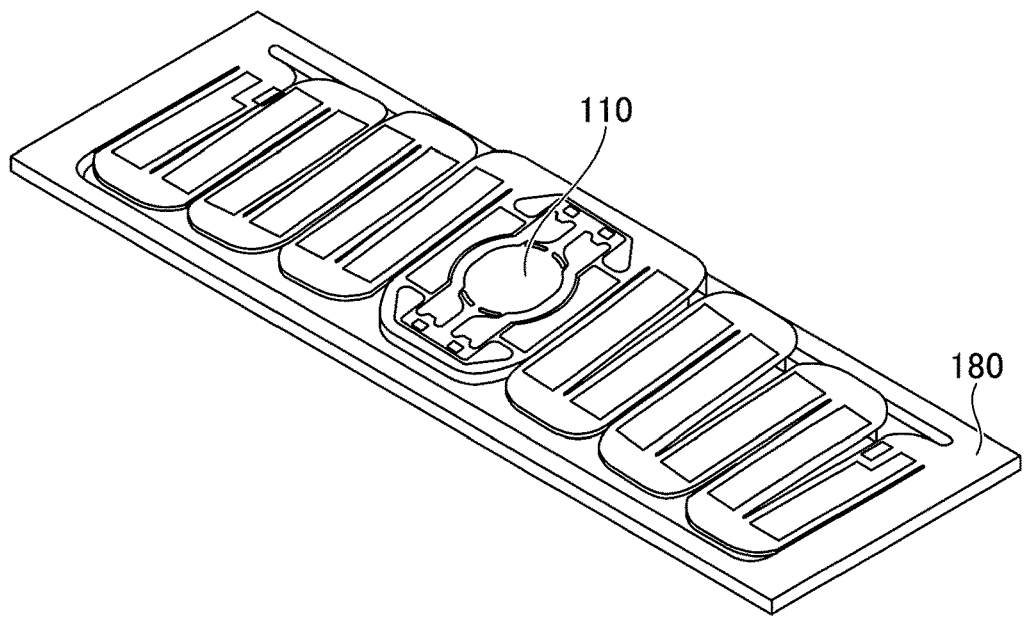
FIGS. 10A through 10D are drawings used to describe eigenmodes of optical scanning devices.
Figure 10B:
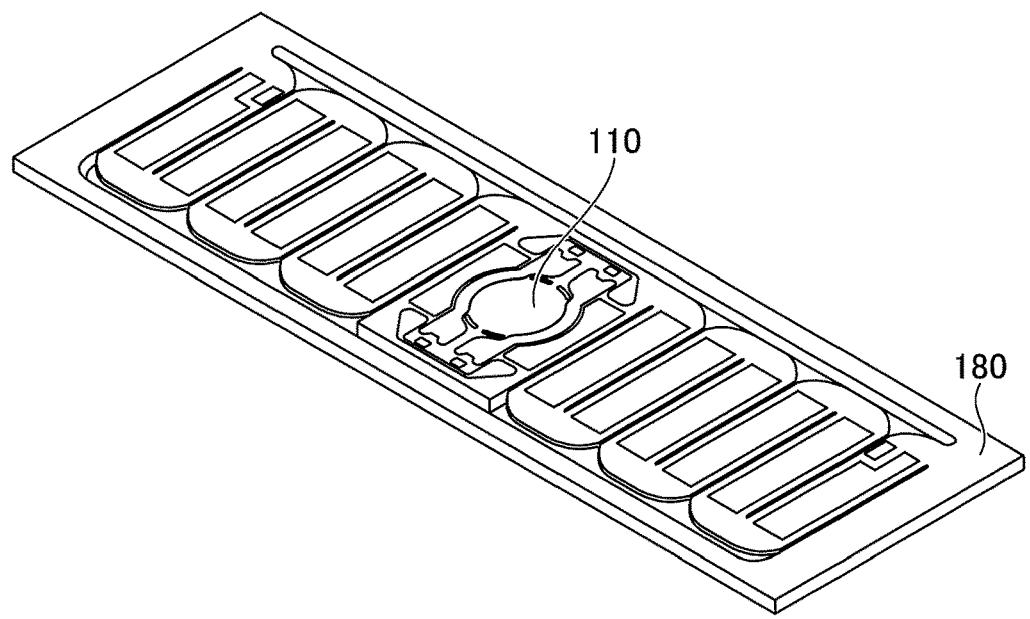
Figure 10C:
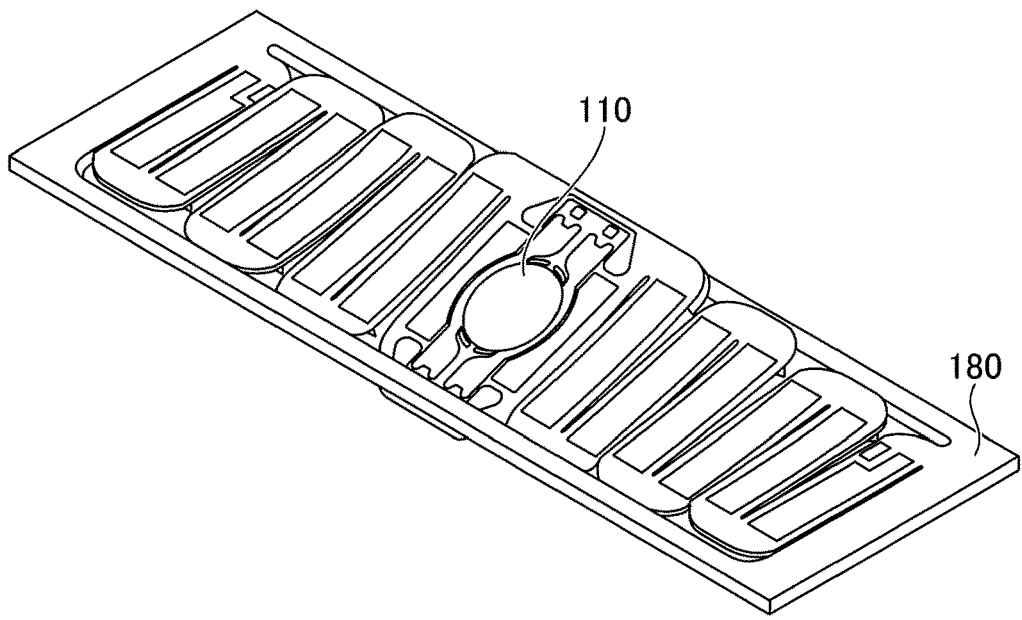
Figure 10D:
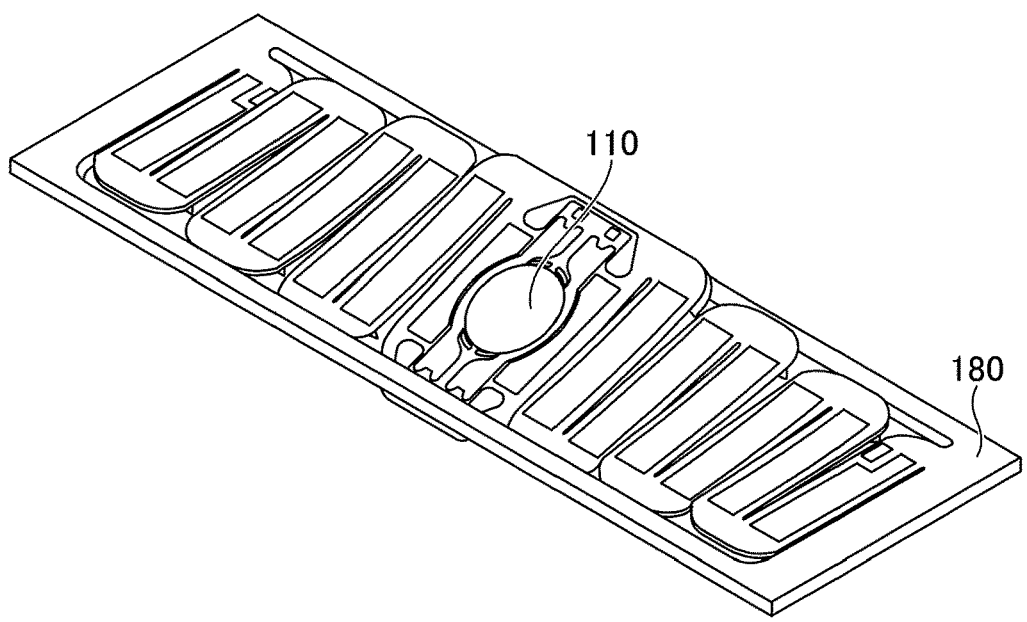

FIGS. 10A through 10D are drawings used to describe eigenmodes of optical scanning devices. FIG. 10A illustrates the positions and attitudes of the driving beams and the mirror when the optical scanning device of the first comparative example is in the eigenmode at the frequency f0. FIG. 10B illustrates the positions and attitudes of the driving beams and the mirror when the optical scanning device 1000 of the first embodiment is in the eigenmode at the frequency f0. FIG. 10O illustrates the positions and attitudes of the driving beams and the mirror when the optical scanning device of the first comparative example is in the eigenmode at the frequency f1. FIG. 10D illustrates the positions and attitudes of the driving beams and the mirror when the optical scanning device 1000 of the first embodiment is in the eigenmode at the frequency f1.

With the optical scanning device of the first comparative example where the center of gravity of the mirror and the mirror support structure is misaligned with the vertical-rotation axis V, both the vertical oscillation and the tilt oscillation become large at the frequency f0. With the optical scanning device 1000 of the first embodiment where the center of gravity of the mirror and the mirror support structure is set on the vertical-rotation axis V by optimizing the weight balance of the mirror and the mirror support structure with respect to the vertical-rotation axis V, the tilt oscillation does not occur and even the vertical oscillation is reduced to the DC level at the frequency f0. In the eigenmode at the frequency f1, no significant difference is observed between the optical scanning devices of the first comparative example and the first embodiment, and large tilt oscillations are observed in both of them.

This indicates that the position of the center of gravity of the mirror and the mirror support structure greatly influences the eigenmode at the frequency f0, and setting the center of gravity of the mirror and the mirror support structure on the vertical-rotation axis V can suppress the resonant condition at the frequency f0.

As described above, the ringing at the frequency f0 can be prevented by adjusting the weight of the mirror and the mirror support structure such that the center of gravity of the mirror and the mirror support structure is located on the vertical-rotation axis V. The ringing at the frequency f1 can be prevented by removing one eigenmode. Accordingly, the ringing at the frequency f1 can be prevented by optimizing the drive waveform of a driving signal using a notch filter. In this case, only frequencies near the frequency f1 need to be reduced using a notch filter, and wideband filtering is not necessary. Therefore, the ringing resulting from the frequency f1 can be prevented without decreasing the length of the linear section S in FIG. 8.

Thus, in the optical scanner 100, the center of gravity of the mirror 110 and the mirror support structure 161 is on the vertical-rotation axis V. This configuration makes it possible to reduce the vertical oscillation and the tilt oscillation at the frequency f0 to almost zero. This in turn makes it possible to reduce the number of eigenmodes that need to be filtered to prevent ringing to one, i.e., the frequency f1, and makes it possible to remove a frequency component corresponding to the eigenfrequency that causes ringing or a harmonic component of the eigenfrequency without performing wideband filtering. In other words, the above configuration makes it possible to apply a highly-linear voltage, which includes a long linear section in one cycle, to the vertical driving sources 171A and 171B. Thus, the first embodiment makes it possible to prevent ringing while securing a section usable for displaying an image.

Second Embodiment

Figure 11:
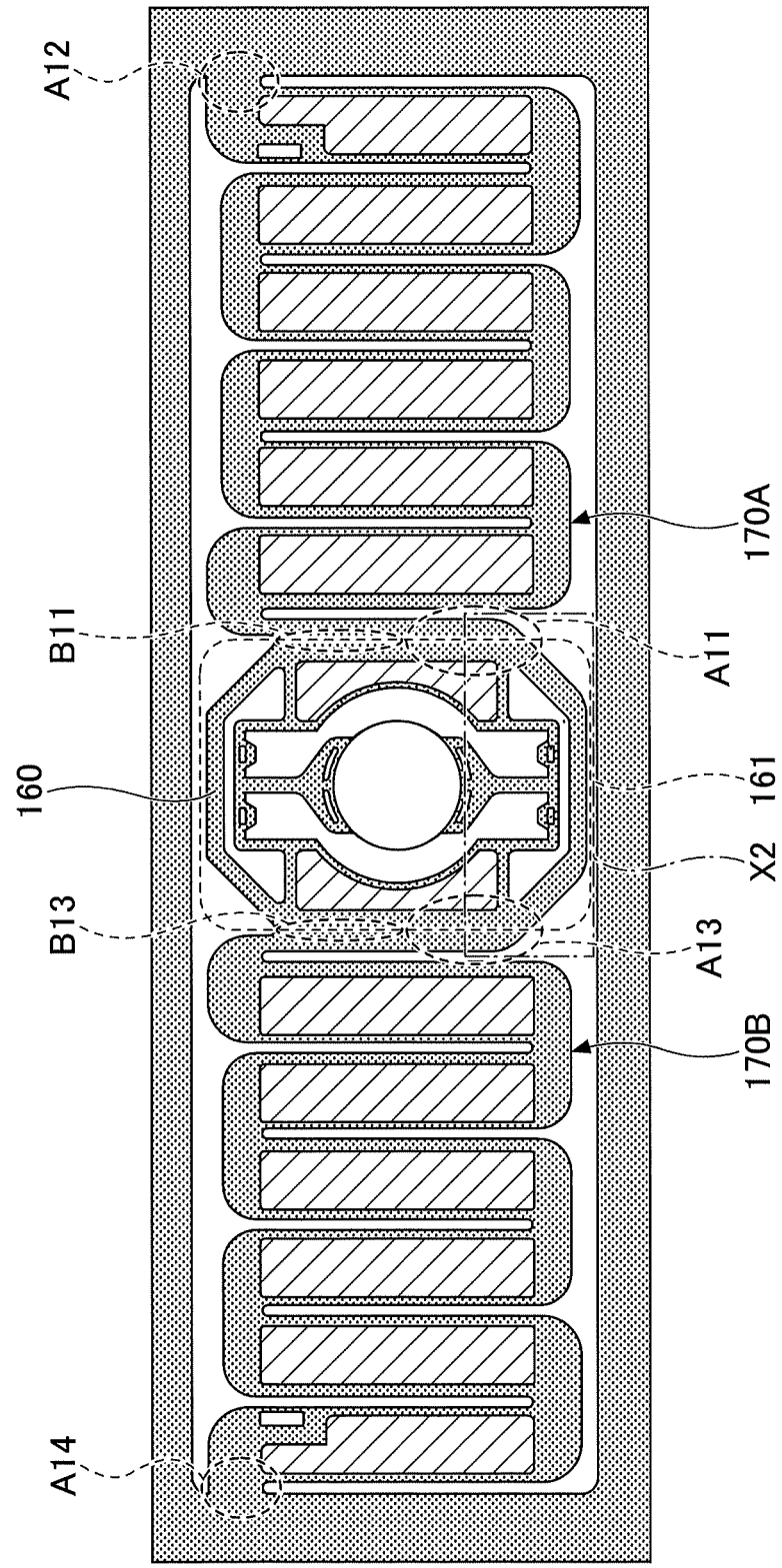
FIG. 11 is a top plan view of an optical scanner of an optical scanning device according to a second embodiment.
Figure 12:
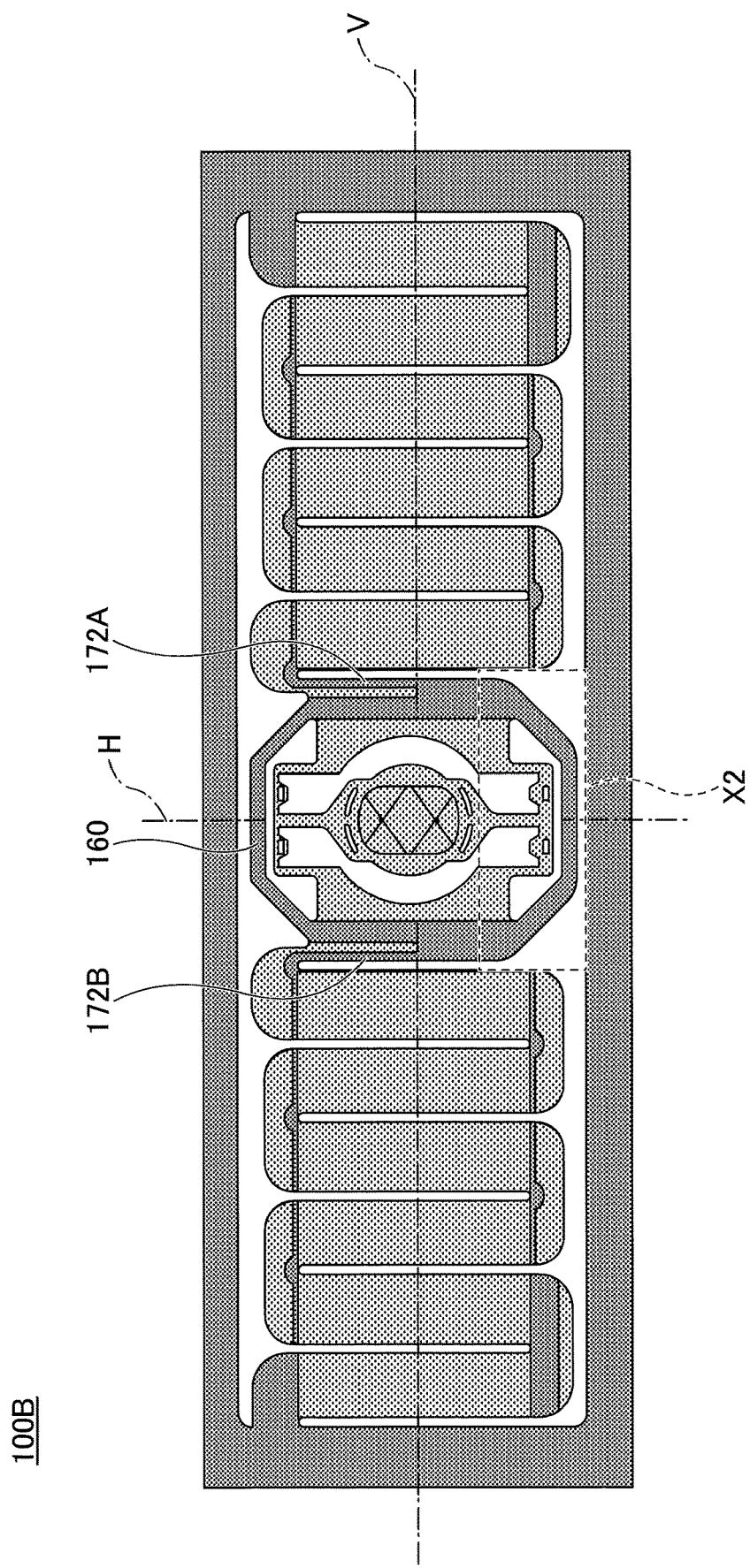
FIG. 12 is a bottom plan view of the optical scanner of the optical scanning device according to the second embodiment.

An optical scanning device according to a second embodiment is described. FIG. 11 is a top plan view of an optical scanner 100B of an optical scanning device according to the second embodiment. FIG. 12 is a bottom plan view of the optical scanner 100B of the optical scanning device according to the second embodiment.

As illustrated in FIGS. 11 and 12, in the optical scanner 100B, ends of the vertical driving beams 170A and 170B are connected via coupling beams 172A and 172B to mirror support structure connectors A11 and A13 on the outer edge of the movable frame 160. In the optical scanning device of the second embodiment, the mirror support structure connectors A11 and A13 connecting the mirror support structure 161 and the vertical driving beams 170A and 170B are disposed, with respect to the vertical-rotation axis V, on a side (first side) that is opposite the side (second side) on which the fixed frame connectors A12 and A14 for connecting the fixed frame 180 and the vertical driving beams 170A and 170B are located. In the optical scanner 100B of the optical scanning device of the second embodiment, the fixed frame connectors A12 and A14 are disposed on the second side of the optical scanner 100B with respect to the vertical-rotation axis V, and the first side (the side of an area X2) of the mirror support structure 161 is made heavier than the second side of the mirror support structure 161 with respect to the vertical-rotation axis V. That is, the first side (the side of the area X2) of the movable frame 160 is made heavier than the second side of the movable frame 160 with respect to the vertical-rotation axis V. Also, the mirror support structure connectors A11 and A13 are located on the first side of the optical scanner 100B with respect to the vertical-rotation axis V.

The optical scanner 100B may be formed using an SOI substrate including, for example, a support layer, a buried oxide (BOX) layer, and an active layer. In this case, as illustrated in FIGS. 11 and 12, the coupling beams 172A and 172B may be connected to the movable frame 160 via the active layer and the BOX layer. In FIGS. 11 and 12, a dotted-line area B11 indicates a portion where the coupling beam 172A is connected to the movable frame 160 via the active layer and the BOX layer, and a dotted-line area B13 indicates a portion where the coupling beam 172B is connected to the movable frame 160 via the active layer and the BOX layer. Also, the coupling beams 172A and 172B may be connected to the movable frame 160 via the active layer only. Configurations of the optical scanning device of the second embodiment other than those described above are substantially the same as the configurations of the optical scanning device 1000 of the first embodiment.

In the optical scanner 100B of the second embodiment, similarly to the first embodiment, the center of gravity of the mirror 110 and the mirror support structure 161 is located on the vertical-rotation axis V. This makes it possible to optimize the weight balance of the mirror 110 and the mirror support structure 161 and to prevent the occurrence of ringing during vertical driving. Also with the above-described configuration where the mirror support structure connectors A11 and A13 are disposed, with respect to the vertical-rotation axis V, on the first side of the optical scanner 100B that is opposite the second side of the optical scanner 100B on which the fixed frame connectors A12 and A14 are located, the ringing during the vertical driving can be prevented by setting the center of gravity of the mirror 110 and the mirror support structure 161 on the vertical-rotation axis V.

Figure 13:
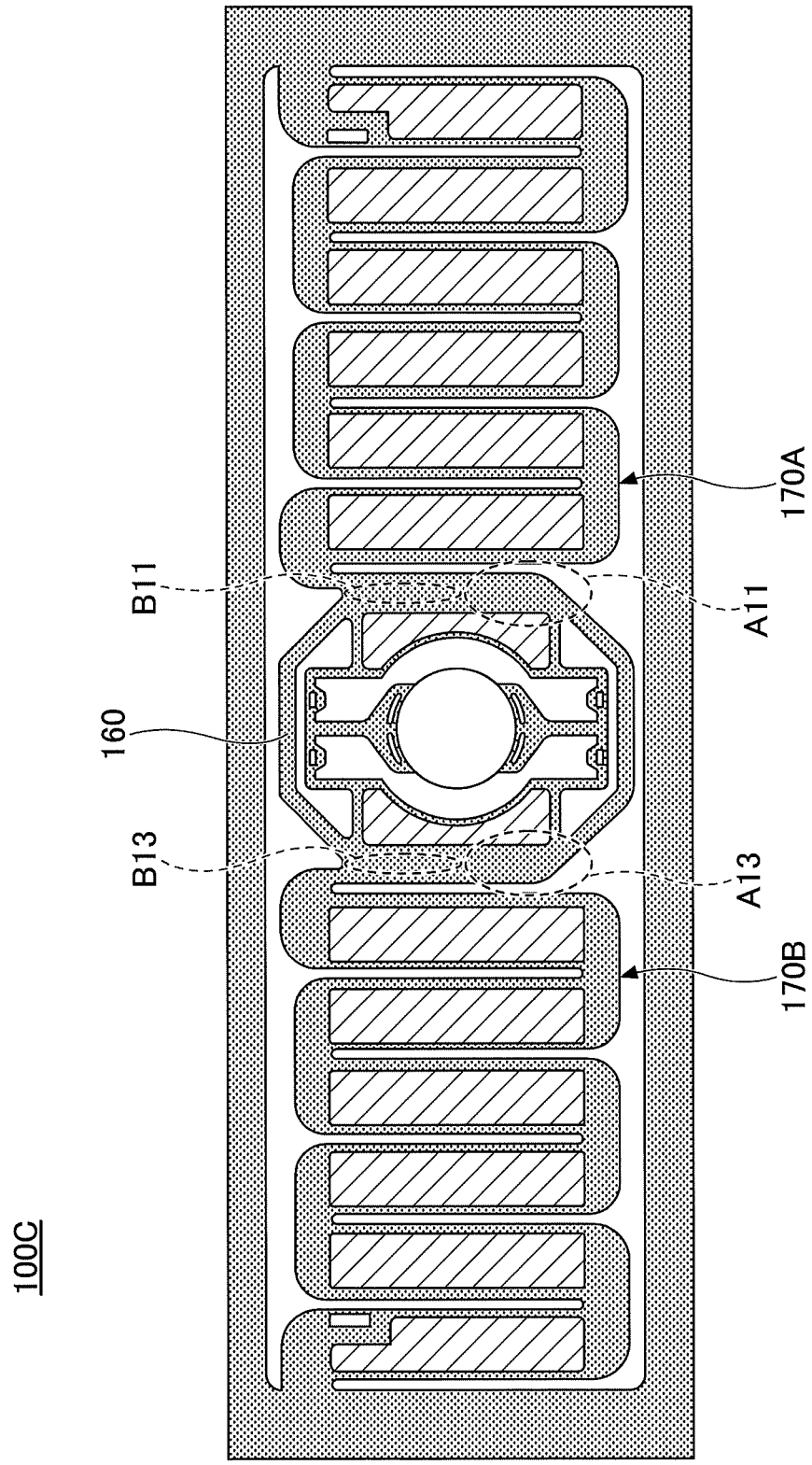
FIG. 13 is a top plan view of an optical scanner of an optical scanning device according to a second comparative example.
Figure 14:
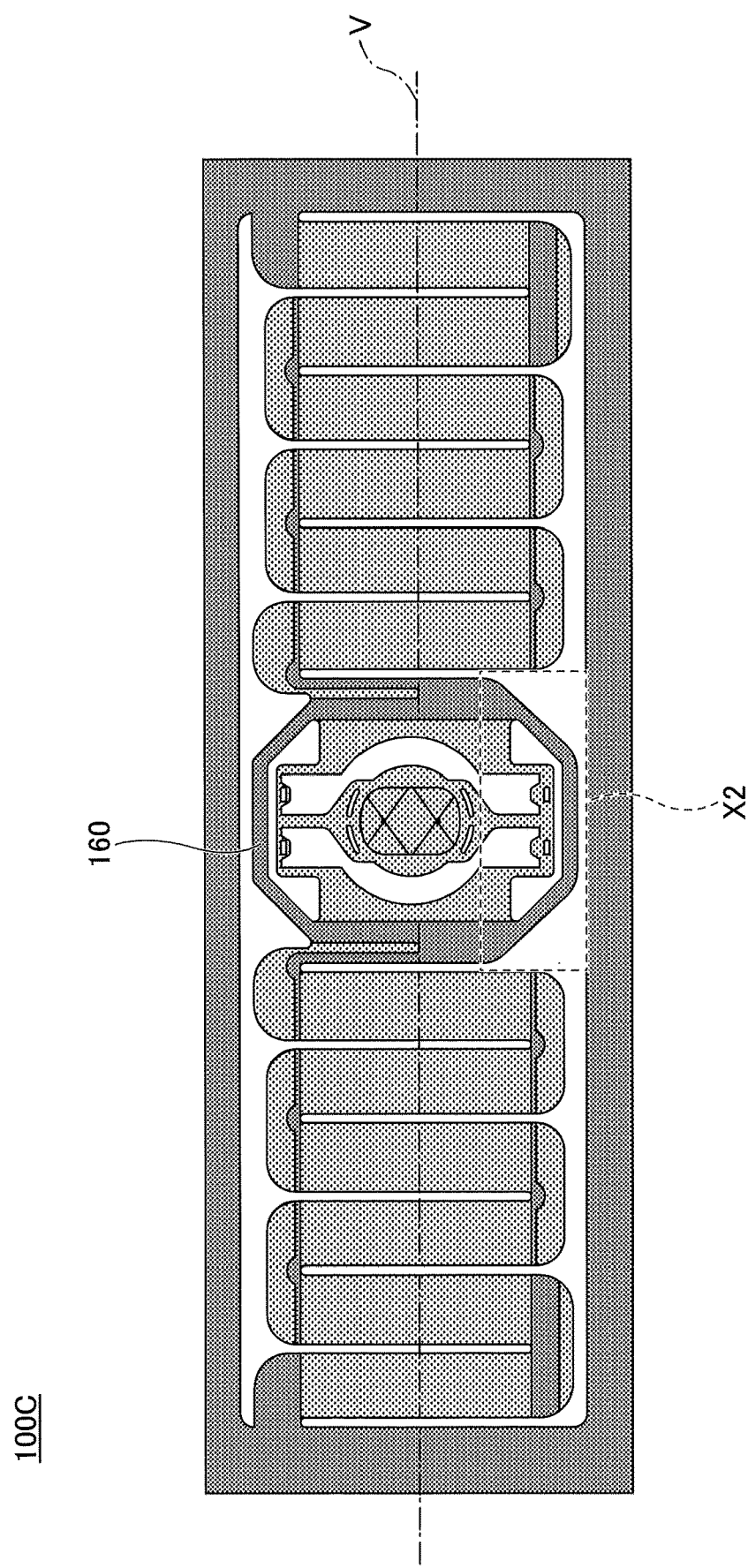
FIG. 14 is a bottom plan view of the optical scanner of the optical scanning device according to the second comparative example.

FIG. 13 is a top plan view of an optical scanner 100C of an optical scanning device according to a second comparative example. FIG. 14 is a bottom plan view of the optical scanner 100C of the optical scanning device according to the second comparative example. In the second embodiment illustrated by FIGS. 11 and 12 and the second comparative example illustrated by FIGS. 13 and 14, the coupling beams 172A and 172B for connecting the mirror support structure 161 and the vertical driving beams 170A and 170B are disposed on the second side with respect to the vertical-rotation axis V, and the mirror support structure connectors A11 and A13 are disposed on the first side with respect to the vertical-rotation axis V. The movable frame 160 is suspended in the air near the vertical-rotation axis V. In the second embodiment illustrated by FIGS. 11 and 12, a portion of the movable frame 160 in the area X2, which is on the first side that is opposite the second side on which the coupling beams 172A and 172B are located, is wider and heavier than portions of the movable frame 160 outside of the area X2. More specifically, the portion of the movable frame 160 in the area X2 includes a part(s) whose inner surface is inclined and angled with respect to the vertical-rotation axis V and the horizontal-rotation axis H and a part whose inner surface is in parallel with the vertical-rotation axis V. The part whose inner surface is inclined and angled with respect to the vertical-rotation axis V and the horizontal-rotation axis H is wider than the other portions of the movable frame 160 outside of the area X2. The part whose inner surface is in parallel with the vertical-rotation axis V has a width that is substantially the same as the width of the other portions of the movable frame 160 outside of the area X2. Alternatively, the part whose inner surface is in parallel with the vertical-rotation axis V may also be wider than the other portions of the movable frame 160 outside of the area X2. With the above configuration of the optical scanner 100B of the second embodiment, the weight balance of the mirror 110 and the mirror support structure 161 is optimized, and the center of gravity of the mirror 110 and the mirror support structure 161 is set on the vertical-rotation axis V. On the other hand, in the second comparative example illustrated by FIGS. 13 and 14, a portion of the movable frame 160 in the area X2, which is on the first side that is opposite the second side on which the coupling beams 172A and 172B are located, has substantially the same width as the width of other portions of the movable frame 160 outside of the area X2. Thus, in the second comparative example, the weight balance of the mirror 110 and the mirror support structure 161 is not optimized, and the center of gravity of the mirror 110 and the mirror support structure 161 is misaligned with the vertical-rotation axis V.

The center of gravity of the mirror 110 and the mirror support 120 is preferably located at the intersection between the vertical-rotation axis V and the horizontal-rotation axis H, i.e., at the center C of the mirror 110. This makes it possible to optimize the weight balance of the mirror 110 and the mirror support structure 161 and prevent the occurrence of ringing during vertical driving, and also makes it possible to optimize the weight balance of the mirror 110 and the mirror support 120 and prevent the occurrence of ringing during horizontal driving. Thus, the above configuration of the second embodiment makes it possible to prevent the occurrence of ringing during vertical driving and horizontal driving.

As described above, even with the configuration of the optical scanner 100B where the mirror support structure connectors A11 and A13 are disposed, with respect to the vertical-rotation axis V, on the first side of the optical scanner 100B that is opposite the second side of the optical scanner 100B on which the fixed frame connectors A12 and A14 are located, the ringing during the vertical driving can be prevented by setting the center of gravity of the mirror 110 and the mirror support structure 161 on the vertical-rotation axis V. Thus, the configuration of the optical scanner 100B of the second embodiment can prevent the occurrence of ringing during vertical driving and horizontal driving, and provides advantageous effects similar to those provided by the configuration of the optical scanner 100 of the first embodiment.

That is, similarly to the first embodiment, the second embodiment makes it possible to reduce the number of eigenmodes that need to be filtered to prevent ringing to one, i.e., the frequency f1, and makes it possible to remove a frequency component corresponding to the eigenfrequency that causes ringing or a harmonic component of the eigenfrequency without performing wideband filtering. This in turn makes it possible to apply a highly-linear voltage, which includes a long linear section in one cycle, to the vertical driving sources 171A and 171B. Thus, the second embodiment makes it possible to prevent ringing while securing a section usable for displaying an image.

In the optical scanner 100B of the optical scanning device of the second embodiment illustrated by FIGS. 11 and 12, ends of the coupling beams 172A and 172B connected to the movable frame 160 are disposed near the vertical-rotation axis V. Also, compared with the positions of the mirror support structure connectors A11 and A13 of the optical scanner 100 of the optical scanning device 1000 of the first embodiment illustrated in FIGS. 3, 4A, and 4B, the positions of the coupling beams 172A and 172B are closer to the vertical-rotation axis V, i.e., to the center. The positions at which the movable frame 160 is movably suspended greatly affect the influence of the weight balance on the oscillation characteristics. If the positions at which the movable frame 160 is suspended are far from the vertical-rotation axis V, the influence of the weight balance on the oscillation characteristics becomes small. On the other hand, if the positions at which the movable frame 160 is suspended are close to the vertical-rotation axis V, the influence of the weight balance on the oscillation characteristics becomes large. In the optical scanner 100 of the first embodiment, the movable frame 160 is suspended at the ends of the movable frame 160. That is, the positions at which the movable frame 160 is suspended are far from the vertical-rotation axis V. With this configuration, the vertical oscillation and tilt of the movable frame 160 in the vertical resonant oscillation mode may vary depending on products. On the other hand, in the optical scanner 100B of the second embodiment, the positions at which the movable frame 160 is suspended are close to the vertical-rotation axis V. With this configuration, the oscillation characteristics do not vary greatly depending on products.

Third Embodiment

Figure 15A:
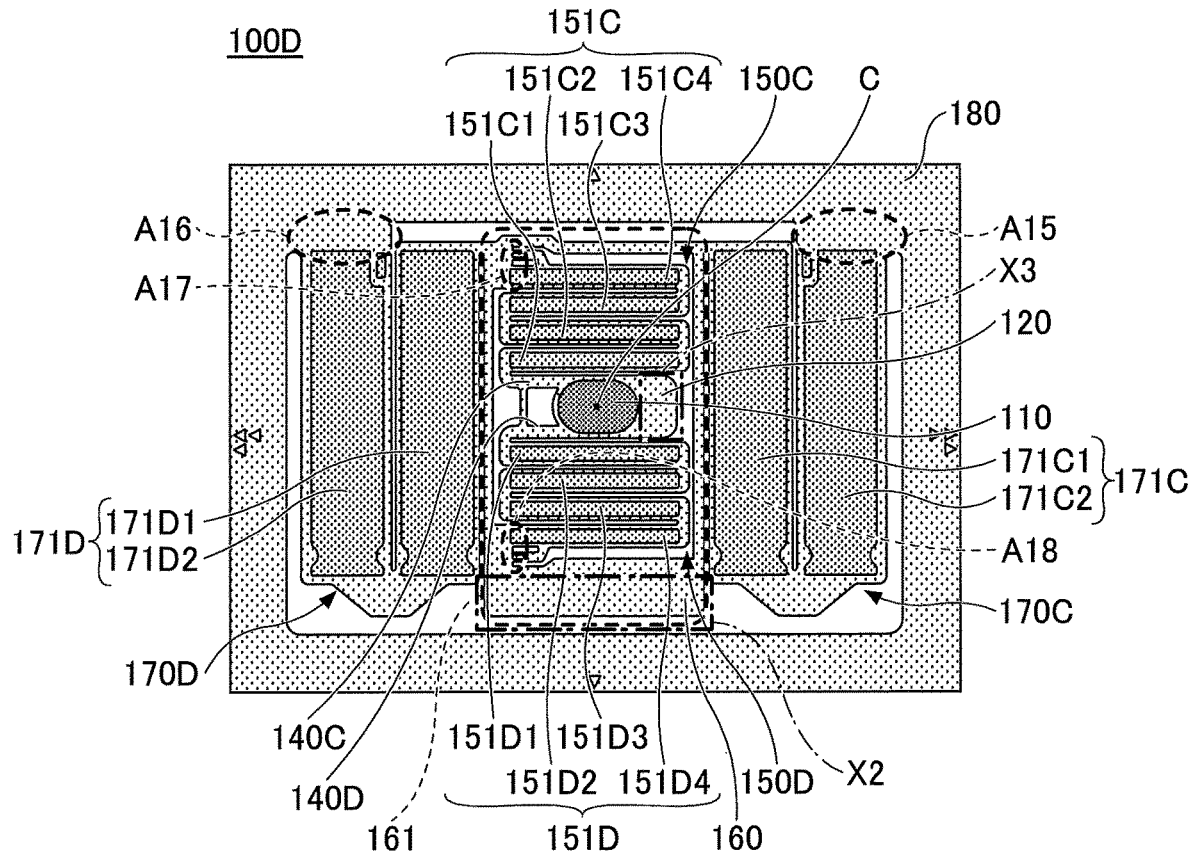
FIGS. 15A and 15B are a top plan view and a bottom plan view of an optical scanner of an optical scanning device according to a third embodiment.
Figure 15B:
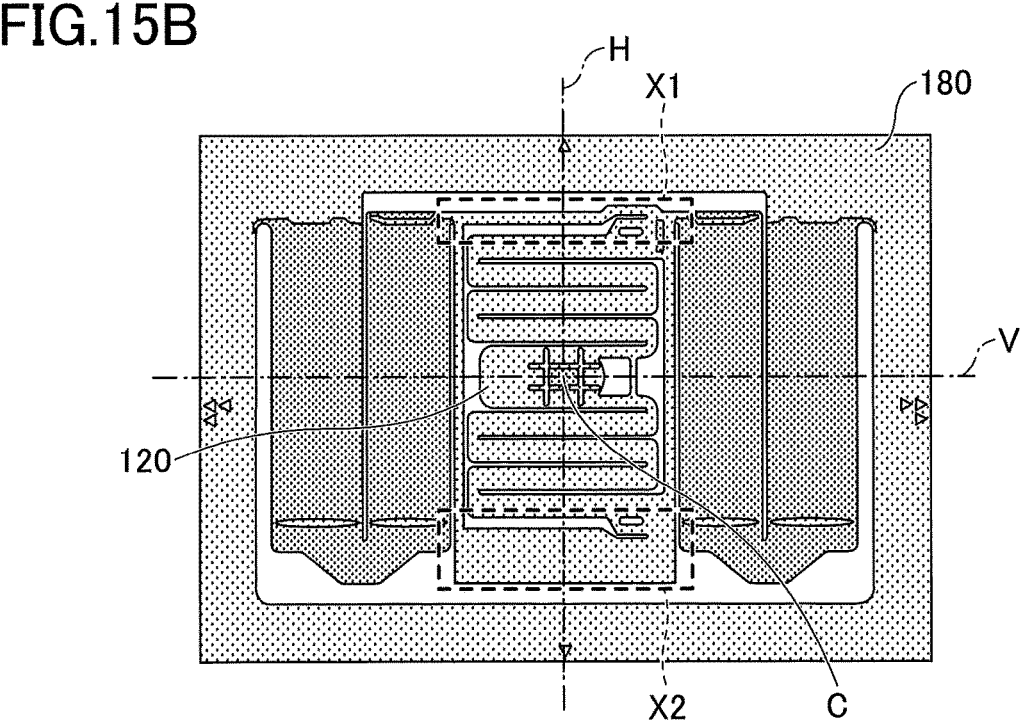

FIG. 15A is a top plan view of an optical scanner 100D of an optical scanning device according to a third embodiment. FIG. 15B is a bottom plan view of the optical scanner 100D of the optical scanning device according to the third embodiment. Similarly to the optical scanner 100 of the first embodiment, the optical scanner 100D of the third embodiment can be placed in a package including, for example, a ceramic package and a package cover. Configurations of the optical scanning device of the third embodiment other than the configuration of the optical scanner 100D are substantially the same as those of the optical scanning device of the first embodiment. The optical scanner 100D scans an incoming laser beam emitted by a light source by causing the mirror 110 to rotate (or oscillate). The optical scanner 100D is, for example, a MEMS mirror where the mirror 110 is driven by piezoelectric elements. The mirror 110 of the optical scanner 100D reflects an incoming laser beam and scans the reflected laser beam two-dimensionally.

As illustrated in FIGS. 15A and 15B, the optical scanner 100D includes the mirror 110, a mirror support 120, coupling beams 140C and 140D, horizontal driving beams 150C and 150D, a movable frame 160, vertical driving beams 170C and 170D, and a fixed frame 180. The mirror 110 is supported on an upper surface of the mirror support 120. In the third embodiment, the mirror support 120, the coupling beams 140C and 140D, the horizontal driving beams 150C and 150D, and the movable frame 160 are collectively referred to as a mirror support structure 161 for supporting the mirror 110.

The horizontal driving beams 150C and 150D connected to the mirror support 120 are disposed on the corresponding sides of the mirror support 120 for supporting the mirror 110. The horizontal driving beams 150C and 150D, the coupling beams 140C and 140D, the mirror support 120, and the mirror 110 are supported by the movable frame 160 surrounding these components. The horizontal driving beam 150C includes multiple rectangular horizontal beams that extend in the direction of a vertical-rotation axis V that is orthogonal to a horizontal-rotation axis H, and ends of adjacent horizontal beams are connected to each other such that the horizontal driving beam 150C forms a zig-zag shape as a whole. One end of the horizontal driving beam 150C is connected to the inner side of the movable frame 160, and another end of the horizontal driving beam 150C is connected via the coupling beam 140C to the mirror support 120. The horizontal driving beam 150D includes multiple rectangular horizontal beams that extend in the direction of the vertical-rotation axis V that is orthogonal to the horizontal-rotation axis H, and ends of adjacent horizontal beams are connected to each other such that the horizontal driving beam 150D forms a zig-zag shape as a whole. One end of the horizontal driving beam 150D is connected to the inner side of the movable frame 160, and another end of the horizontal driving beam 150D is connected via the coupling beam 140D to the mirror support 120.

The vertical driving beams 170C and 170D connected to the mirror support structure 161 are disposed on the corresponding sides of the mirror support structure 161. The vertical driving beam 170C includes multiple rectangular vertical beams that extend in the direction of the horizontal-rotation axis H, and ends of adjacent vertical beams are connected to each other such that the vertical driving beam 170C forms a zig-zag shape as a whole. One end of the vertical driving beam 170C is connected to the inner side of the fixed frame 180, and another end of the vertical driving beam 170C is connected to the outer side of the movable frame 160. The vertical driving beam 170D includes multiple rectangular vertical beams that extend in the direction of the horizontal-rotation axis H, and ends of adjacent vertical beams are connected to each other such that the vertical driving beam 170D forms a zig-zag shape as a whole. One end of the vertical driving beam 170D is connected to the inner side of the fixed frame 180, and another end of the vertical driving beam 170D is connected to the outer side of the movable frame 160.

The horizontal driving beams 150C and 150D include horizontal driving sources 151C and 151D, respectively. Also, the vertical driving beams 170C and 170D include vertical driving sources 171C and 171D, respectively. The horizontal driving beams 150C and 150D and the vertical driving beams 170C and 170D function as actuators that cause the mirror 110 to rotate (or oscillate) vertically and horizontally to scan a laser beam.

On the upper surfaces of the horizontal driving beams 150C and 150D, the horizontal driving sources 151C and 151D are formed for respective horizontal beams that are rectangular units including no curved section. The horizontal driving source 151C includes an upper electrode formed on the upper surface of a piezoelectric thin film on the upper surface of the horizontal driving beam 150C and a lower electrode formed on the lower surface of the piezoelectric thin film. The horizontal driving source 151D includes an upper electrode formed on the upper surface of a piezoelectric thin film on the upper surface of the horizontal driving beam 150D and a lower electrode formed on the lower surface of the piezoelectric thin film.

In each of the horizontal driving beams 150C and 150D, driving voltages with different polarities are applied to horizontal driving sources 151C/151D on adjacent horizontal beams to cause the adjacent horizontal beams to warp in opposite vertical directions, and the accumulation of the vertical movement of the horizontal beams is transmitted to the mirror support 120. With the movement of the horizontal driving beams 150C and 150D, the mirror 110 and the mirror support 120 rotate (or oscillate) around the horizontal-rotation axis H. The direction of this rotation (or oscillation) is referred to as a horizontal direction, and the axis of this rotation (or oscillation) that passes through the center C of the light reflection surface of the mirror 110 is referred to as the horizontal-rotation axis H. For example, nonresonant oscillation may be used for the horizontal driving by the horizontal driving beams 150C and 150D.

For example, the horizontal driving source 151C includes horizontal driving sources 151C1, 151C2, 151C3, and 151C4 that are formed on the first through fourth horizontal beams constituting the horizontal driving beam 150C. The horizontal driving source 151D includes horizontal driving sources 151D1, 151D2, 151D3, and 151D4 that are formed on the first through fourth horizontal beams constituting the horizontal driving beam 150D. In this case, the mirror 110 and the mirror support 120 can be rotated in the horizontal direction by driving the horizontal driving sources 151C1, 151D1, 151C3, and 151D3 using the same waveform with a first phase and driving the horizontal driving sources 151C2, 151D2, 151C4, and 151D4 using the same waveform with a second phase that is different from the first phase.

On the upper surfaces of the vertical driving beams 170C and 170D, the vertical driving sources 171C and 171D are formed for respective vertical beams that are rectangular units including no curved section. The vertical driving source 171C includes an upper electrode formed on the upper surface of a piezoelectric thin film on the upper surface of the vertical driving beam 170C and a lower electrode formed on the lower surface of the piezoelectric thin film. The vertical driving source 171D includes an upper electrode formed on the upper surface of a piezoelectric thin film on the upper surface of the vertical driving beam 170D and a lower electrode formed on the lower surface of the piezoelectric thin film.

In each of the vertical driving beams 170C and 170D, driving voltages with different polarities are applied to vertical driving sources 171C/171D on adjacent vertical beams to cause the adjacent vertical beams to warp in opposite vertical directions, and the accumulation of the vertical movement of the vertical beams is transmitted to the mirror support structure 161. With the movement of the vertical driving beams 170C and 170D, the mirror 110 and the mirror support structure 161 rotate (or oscillate) around a rotation axis that is orthogonal to the direction of the horizontal-rotation axis H. The direction of this rotation (or oscillation) is referred to as a vertical direction, and this rotation axis that passes through the center C of the light reflection surface of the mirror 110 is referred to as a vertical-rotation axis V. For example, nonresonant oscillation may be used for the vertical driving by the vertical driving beams 170C and 170D.

For example, the vertical driving source 171C includes vertical driving sources 171C1 and 171C2 that are formed on the first and second vertical beams constituting the vertical driving beam 170C. The vertical driving source 171D includes vertical driving sources 171D1 and 171D2 that are formed on the first and second vertical beams constituting the vertical driving beam 170D. In this case, the mirror 110 and the mirror support structure 161 can be rotated in the vertical direction by driving the vertical driving sources 171C1 and 171D1 using the same waveform with a first phase and driving the vertical driving sources 171C2 and 171D2 using the same waveform with a second phase that is different from the first phase.

In the optical scanning device of the third embodiment, one side (first side) of the mirror 110 and the mirror support structure 161 is preferably heavier than the other side (second side) of the mirror 110 and the mirror support structure 161 with respect to the vertical-rotation axis V. This makes it possible to optimize the weight balance of the mirror 110 and the mirror support structure 161 and makes it easier to set the center of gravity of the mirror 110 and the mirror support structure 161 on the vertical-rotation axis V. For example, the first side of the mirror 110 and the mirror support structure 161 can be made heavier than the second side of the mirror 110 and the mirror support structure 161 with respect to the vertical-rotation axis V by making the first side of the movable frame 160 heavier than the second side of the movable frame 160 with respect to the vertical-rotation axis V. To achieve this configuration, for example, the width of the movable frame 160 on the first side may be made greater than the width of the movable frame 160 on the second side with respect to the vertical-rotation axis V. In the optical scanner 100D of the optical scanning device of the third embodiment, fixed frame connectors A15 and A16 are disposed on the second side of the optical scanner 100D with respect to the vertical-rotation axis V, and the first side (the side of an area X2) of the mirror support structure 161 is made heavier than the second side of the mirror support structure 161 with respect to the vertical-rotation axis V. That is, the first side (the side of the area X2) of the movable frame 160 is made heavier than the second side of the movable frame 160 with respect to the vertical-rotation axis V.

In the optical scanning device of the third embodiment, the center of gravity of the mirror 110 and the mirror support 120 is preferably on the horizontal-rotation axis H. This makes it possible to optimize the weight balance of the mirror 110 and the mirror support 120 and to prevent the occurrence of ringing during horizontal driving. For example, the center of gravity of the mirror 110 and the mirror support 120 is at the intersection between the horizontal-rotation axis H and the vertical-rotation axis V. This may be achieved, for example, by disposing mirror support connectors connecting the mirror support 120 and the coupling beams 140C and 140D on a second side (second predetermined side) with respect to the horizontal-rotation axis H, and making a first side (first predetermined side) of the mirror 110 and the mirror support 120 heavier than the second side of the mirror 110 and the mirror support 120 with respect to the horizontal-rotation axis H. To achieve this configuration, for example, the first side of the mirror support 120 may be made wider than the second side of the mirror support 120 with respect to the horizontal-rotation axis H. In the optical scanner 100D of the optical scanning device of the third embodiment, movable frame connectors A17 and A18 are disposed on the second side with respect to the horizontal-rotation axis H, and the first side (the side of an area X3) of the mirror support 120 is made heavier than the second side of the mirror support 120 with respect to the horizontal-rotation axis H.

The above configuration of the optical scanning device of the third embodiment makes it possible to optimize the weight balance of the mirror 110 and the mirror support structure 161 and prevent the occurrence of ringing during vertical driving, and also makes it possible to optimize the weight balance of the mirror 110 and the mirror support 120 and prevent the occurrence of ringing during horizontal driving. Thus, the above configuration of the third embodiment makes it possible to prevent the occurrence of ringing during vertical driving and horizontal driving.

An aspect of this disclosure makes it possible to prevent or reduce the occurrence of ringing in an optical scanning device.

Optical scanning devices according to embodiments of the present invention are described above. However, the present invention is not limited to the specifically disclosed embodiments, and variations and modifications may be made without departing from the scope of the present invention.

What is claimed is:

1. An optical scanning device, comprising:
a mirror including a light reflection surface;
a mirror support structure that supports the mirror;
a pair of first driving beams connected to the mirror support structure and disposed on corresponding sides of the mirror support structure;
first driving sources disposed on the first driving beams and configured to cause the mirror to rotate around a first axis that passes through a center of the light reflection surface; and
a fixed frame that supports the first driving beams, wherein each of the first driving beams includes multiple first beams extending in a direction that is orthogonal to the first axis;
ends of adjacent first beams are connected to each other such that each of the first driving beams forms a zig-zag shape as a whole;
a center of gravity of the mirror and the mirror support structure is located on the first axis; and
the mirror support structure includes
a mirror support that supports the mirror,
a pair of second driving beams connected to the mirror support and disposed on corresponding sides of the mirror support,
a movable frame to which the first driving beams and the second driving beams are connected, and
second driving sources disposed on the second driving beams and configured to cause the mirror to rotate around a second axis that is substantially orthogonal to the first axis and passes through the center of the light reflection surface.

2. The optical scanning device as claimed in claim 1, wherein
the movable frame is connected to the first driving beams via a pair of mirror support structure connectors that are disposed on a second side that is opposite a first side with respect to the first axis; and
the movable frame is configured such that a portion of the movable frame on the first side is heavier than a portion of the movable frame on the second side.

3. The optical scanning device as claimed in claim 2, wherein the fixed frame is connected to the first driving beams via a pair of fixed frame connectors that are disposed on the second side.

4. The optical scanning device as claimed in claim 2, wherein a width of the portion of the movable frame on the first side is greater than a width of the portion of the movable frame on the second side.

5. The optical scanning device as claimed in claim 2, wherein a center of gravity of the mirror and the mirror support is located at an intersection between the first axis and the second axis.

6. The optical scanning device as claimed in claim 2, wherein the second driving beams are connected to the mirror support via a torsion beam that enables the mirror to rotate around the second axis.

7. The optical scanning device as claimed in claim 2, wherein
each of the second driving beams includes multiple second beams extending in a direction that is orthogonal to the second axis; and
ends of adjacent second beams are connected to each other such that each of the second driving beams forms a shape as a whole.

8. The optical scanning device as claimed in claim 7, wherein
the mirror support is connected to the second driving beams via a pair of mirror support connectors that are disposed on a second predetermined side that is opposite a first predetermined side with respect to the second axis; and
the mirror support is configured such that a portion of the mirror support on the first predetermined side is heavier than a portion of mirror support on the second predetermined side.

9. The optical scanning device as claimed in claim 7, wherein
the movable frame is connected to the second driving beams via a pair of movable frame connectors that are disposed on a second predetermined side that is opposite a first predetermined side with respect to the second axis; and
the mirror support is configured such that a portion of the mirror support on the first predetermined side is heavier than a portion of the mirror support on the second predetermined side.

10. The optical scanning device as claimed in claim 1, wherein
the fixed frame is connected to the first driving beams via a pair of fixed frame connectors that are disposed on a second side that is opposite a first side with respect to the first axis; and
the movable frame is configured such that a portion of the movable frame on the first side is heavier than a portion of the movable frame on the second side.

11. The optical scanning device as claimed in claim 10, wherein the mirror support structure is connected to the first driving beams via a pair of mirror support structure connectors that are disposed on the first side.

12. An optical scanning device, comprising:
a mirror including a light reflection surface;
a mirror support structure that supports the mirror;
a pair of first driving beams connected to the mirror support structure and disposed on corresponding sides of the mirror support structure;
first driving sources disposed on the first driving beams and configured to cause the mirror to rotate around a first axis that passes through a center of the light reflection surface; and
a fixed frame that supports the first driving beams, wherein
a center of gravity of the mirror and the mirror support structure is located on the first axis;
the mirror support structure is connected to the first driving beams via a pair of mirror support structure connectors that are disposed on a second side that is opposite a first side with respect to the first axis; and
the mirror support structure is configured such that a portion of the mirror support structure on the first side is heavier than a portion of the mirror support structure on the second side.

13. The optical scanning device as claimed in claim 12, wherein the fixed frame is connected to the first driving beams via a pair of fixed frame connectors that are disposed on the second side.

14. An optical scanning device, comprising:
a mirror including a light reflection surface;
a mirror support structure that supports the mirror;
a pair of first driving beams connected to the mirror support structure and disposed on corresponding sides of the mirror support structure;
first driving sources disposed on the first driving beams and configured to cause the mirror to rotate around a first axis that passes through a center of the light reflection surface; and
a fixed frame that supports the first driving beams, wherein
a center of gravity of the mirror and the mirror support structure is located on the first axis;
the fixed frame is connected to the first driving beams via a pair of fixed frame connectors that are disposed on a second side that is opposite a first side with respect to the first axis; and the mirror support structure is configured such that a portion of the mirror support structure on the first side is heavier than a portion of the mirror support structure on the second side.

15. The optical scanning device as claimed in claim 14, wherein the mirror support structure is connected to the first driving beams via a pair of mirror support structure connectors that are disposed on the first side.

* * * * *